United States Patent [19]

Higgins et al.

[11] Patent Number: 4,728,578

[45] Date of Patent: Mar. 1, 1988

[54] COMPOSITIONS CONTAINING BASIC METAL SALTS AND/OR NON-NEWTONIAN COLLOIDAL DISPERSE SYSTEMS AND VINYL AROMATIC CONTAINING POLYMERS

[75] Inventors: William A. Higgins, Gates Mills; John Bretz, Parma, both of Ohio

[73] Assignee: The Lubrizol Corporation, Wickliffe, Ohio

[21] Appl. No.: 896,544

[22] Filed: Aug. 13, 1986

[51] Int. Cl.$^4$ .................... B32B 15/08; C09K 3/00; B05D 3/02

[52] U.S. Cl. .................... 428/462; 252/393; 252/395; 252/396; 427/388.2; 427/388.4; 427/388.5

[58] Field of Search .............. 427/388.2, 388.4, 388.5; 252/395, 396, 393; 428/462; 148/6.14 RR

[56] References Cited

U.S. PATENT DOCUMENTS

| | | | |
|---|---|---|---|
| 3,384,586 | 5/1968 | McMillen | 252/33 |
| 3,485,787 | 12/1969 | Haefele et al. | 260/33.6 |
| 3,492,231 | 1/1970 | McMillen | 252/33 |
| 3,554,911 | 1/1971 | Schiff et al. | 252/59 |
| 3,565,672 | 2/1971 | Adams | 117/75 |
| 3,661,622 | 5/1972 | Rogers | 117/75 |
| 3,668,125 | 6/1972 | Anderson | 252/59 |
| 3,671,012 | 6/1972 | Scott et al. | 252/33.4 |
| 3,746,643 | 7/1973 | Rogers | 252/33 |
| 3,763,044 | 10/1973 | Anderson | 252/59 |
| 3,965,019 | 6/1976 | St. Clair et al. | 252/59 |
| 4,032,459 | 6/1977 | Crossland et al. | 252/51.5 A |
| 4,033,888 | 7/1977 | Kiovsky | 252/56 |
| 4,036,910 | 7/1977 | Anderson | 260/879 |
| 4,086,179 | 4/1978 | Schneider | 252/171 |
| 4,264,363 | 4/1981 | Cech | 524/425 X |
| 4,305,855 | 12/1981 | Bretz | 524/62 |
| 4,425,466 | 1/1984 | Santer et al. | 524/512 |
| 4,436,855 | 3/1984 | Higgins et al. | 524/145 |
| 4,443,577 | 4/1984 | Higgins et al. | 524/590 |
| 4,468,339 | 8/1984 | Rysek et al. | 252/75 |
| 4,525,890 | 7/1985 | Peerman et al. | 15/193 |
| 4,629,753 | 12/1986 | Quinn | 524/394 |

Primary Examiner—Thurman K. Page
Attorney, Agent, or Firm—James L. Cordek; Denis A. Polyn; Joseph P. Fischer

[57] ABSTRACT

The present invention relates to modified non-Newtonian colloidal disperse systems exhibiting improved thickening power, particularly when diluted. These compositions are useful as high-solids, thermosetting caulks, molding compositions, extruding compositions and the like, but are particularly suitable for use as high solids thermosetting coating compositions. These coating compositions are heat-stable and sag-resistant.

The compositions of this invention comprise a mixture of
(B) at least one non-Newtonian colloidal disperse system comprising
  (B-1) solid metal-containing colloidal particles,
  (B-2) a liquid dispersing medium, and
  (B-3) at least one organic compound which is soluble in said dispersing medium, the molecules of said organic compound being characterized by a hydrophobic portion and at least one polar substituent; and
(C) at least one hydrogenated block copolymer of a vinyl aromatic monomer and an aliphatic conjugated diene.

Optionally, the compositions also contain (D) a substantially inert, normally liquid diluent.

The invention also relates to methods of coating metal surfaces with the compositions of the invention described above as well as compositions comprising mixtures of neutral and/or basic metal salts of organic acidic materials and the copolymers (C) described above.

108 Claims, No Drawings

COMPOSITIONS CONTAINING BASIC METAL SALTS AND/OR NON-NEWTONIAN COLLOIDAL DISPERSE SYSTEMS AND VINYL AROMATIC CONTAINING POLYMERS

TECHNICAL FIELD

This invention relates to compositions comprising basic metal salts and/or non-Newtonian colloidal dispersed systems and vinyl aromatic copolymers. These compositions are useful as caulks, extruding compositions, molding compositions and the like, but have particular utility as high solids thermosetting coating compositions. Methods of coating metal surfaces and coated metal surfaces also are disclosed.

BACKGROUND OF THE INVENTION

Coating compositions which have been used heretofore have been primarily organic-solvent based compositions, typically containing high-solvent concentrations of 40–50% by weight or more. Use of such solvent-based coatings have caused in significant air pollution problems resulting from the evaporation of organic solvents into the atmosphere during cure.

One alternative to such solvent-based coatings that has been proposed is the use of "high solids" formulations. Theoretically, these proposed formulations would contain at least about 60% by volume solids, preferably at least about 85% by volume or higher, with the remainder being organic and/or water solvent. The term "solids" is used herein and in the appended-to claims to mean the portion of the composition which is not subject to evaporation during cure. The "solids" may or may not themselves be solid before cure. Typically, the "solids" in the described compositions include resins.

U.S. Pat. Nos. 3,384,586 and 3,492,231 disclose resinous compositions containing a polymeric resin such as a polyolefin, polyamide, acrylic, polystyrene, polysulfide, polyether, polyester, melamine resin, alkyd resin and the like in combination with a minor amount of a non-Newtonian colloidal disperse system comprising (1) solid metal-containing colloidal particles predispersed in (2) a dispersing medium and (3) as an essential third component at least one organic compound which is soluble in said dispersing medium, the molecules of said organic compound being characterized by a hydrophobic portion and at least one polar substituent.

U.S. Pat. Nos. 4,436,855 and 4,443,577 disclose urethane coating compositions containing minor amounts of non-Newtonian colloidal disperse systems comprising (1) solid metal-containing colloidal particles predispersed in (2) a disperse medium of at least one inert organic liquid and (3) as an essential third component at least one member selected from the class consisting of organic compounds which are substantially soluble in said disperse medium, the molecules of said organic compound being characterized by polar substituents and hydrophobic portions. The former patent relates to two-component urethane coating systems which further comprise an organic polyfunctional isocyanate and an acidic ester of a phosphoric acid. The latter patent relates to one-component moisture curable urethane coating compositions which further comprise an isocyanate-terminated prepolymer.

U.S. Pat. No. 4,425,466 discloses coating compositions containing a partially methylated partially methylolated melamine and a polyfunctional compound containing on average at least two functional groups per molecule selected from the group consisting of carboxy, hydroxy, primary and secondary amide and urethane. The reference indicates that the coating compositions are stable at ambient temperature and capable of fast cure response at relatively low curing temperatures.

Grease compositions comprising a major amount of a thixotropic grease-like composition consisting essentially of a nonvolatile diluent oil, an oil-soluble dispersing agent, and an alkaline earth metal carbonate, and a minor amount of a polymer are described in U.S. Pat. Nos. 3,671,012 and 3,661,622. In U.S. Pat. No. 3,565,672, a method of improving the resistance of metal to corrosion is described which utilizes a grease-like composition comprising a nonvolatile diluent, a dispersing agent and a basic alkaline earth metal component as a coating composition which is then painted with a conventional paint. Compositions comprising a mixture of microcrystalline wax, dispersing agent and an alkaline earth metal carbonate are described in U.S. Pat. No. 3,746,643. Optionally, the mixture can contain a minor amount of a nonvolatile diluent oil.

A material used for minimizing the viscosity change of a substrate with temperature is called a viscosity modifier, viscosity improver, viscosity index improver or VI improver. The words "viscosity index improver" or "VI improver" have traditionally been used as synonyms for the words viscosity modifier or viscosity improver. Although a few non-polymeric substances such as metallic soaps exhibit VI improving properties, the VI improvers most often used are oil-soluble organic polymers. These polymers include polyisobutylenes; polymethacrylates (i.e., copolymers of various chain length alkyl methacrylates); copolymers of ethylene and propylene; and polyacrylates (i.e., copolymers of various chain length alkyl acrylates).

In recent years, there has been developed a series of hydrogenated block copolymers of styrene and conjugated dienes such as isoprene which are useful in lubricating oils as VI improvers. The physical nature of these hydrogenated block copolymers is such that they are supplied commercially as baled material, crumbs or pellets, or as additive concentrates containing these copolymers. Additive concentrates of this type are commercially available from the Shell Chemical Company under the names Shellvis 40 VI Improver Concentrate and Shellvis 50 VI Improver Concentrate. Copolymers of these types are described in, e.g., U.S. Pat. Nos. 3,554,911; 3,688,125; 3,763,044; 3,965,019; and 4,036,910.

SUMMARY OF THE INVENTION

The present invention relates to modified non-Newtonian colloidal disperse systems exhibiting improved thickening power, particularly when diluted. These compositions are useful as high-solids, thermosetting caulks, molding compositions, extruding compositions and the like, but are particularly suitable for use as high solids thermosetting coating compositions. These coating compositions are heat-stable and sag-resistant.

The compositions of this invention comprise a mixture of (B) at least one non-Newtonian colloidal disperse system comprising (B-1) solid metal-containing colloidal particles, (B-2) a liquid dispersing medium, and (B-3) at least one organic compound which is soluble in said dispersing medium, the molecules of said organic compound being characterized by a hydrophobic portion and at least one polar substituent; and (C) at least one hydrogenated block copolymer of a vinyl aromatic monomer and an aliphatic conjugated diene.

Optionally, the compositions also contain (D) a substantially inert, normally liquid diluent.

The invention also relates to methods of coating metal surfaces with the compositions of the invention described above as well as compositions comprising mixtures of neutral and/or basic metal salts of organic acidic materials (A) and the copolymers (C) described above.

DETAILED DESCRIPTION OF THE PREFERRED EMBODIMENTS

The term "hydrocarbyl" is used herein to include substantially hydrocarbyl groups (for example, substantially hydrocarbyloxy, etc.), as well as purely hydrocarbyl groups. The description of these groups as being substantially hydrocarbyl means that they contain no non-hydrocarbyl substituents or non-carbon atoms which significantly affect the hydrocarbyl characteristics or properties of such groups relevant to their uses as described herein.

Non-limiting examples of substituents which do not significantly alter the hydrocarbyl characteristics or properties of the general nature of the hydrocarbyl groups of this invention are the following:

Ether groups (especially hydrocarbyloxy such as phenoxy, benzyloxy, methoxy, n-butoxy, etc., and particularly alkoxy groups of up to about 10 carbon atoms);

Oxo groups (e.g., —O— linkages in the main carbon chain);

Nitro groups;

Thioether groups (especially $C_{1-10}$ alkyl thioether);

Thia groups (e.g., —S— linkages in the main carbon chain);

Carbohydrocarbyloxy groups (e.g.,

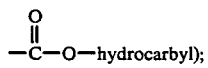
—C—O—hydrocarbyl);

Sulfonyl groups (e.g.,

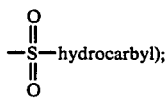
—S—hydrocarbyl);

Sulfinyl groups (e.g.,

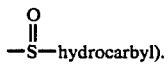
—S—hydrocarbyl).

This list is intended to be merely illustrative and not exhaustive, and the omission of a certain class of substituent is not meant to require its exclusion. In general, if such substituents are present, there will not be more than two for each 10 carbon atoms in the substantially hydrocarbyl group and preferably not more than one for each 10 carbon atoms since this number of substituents usually will not substantially affect the hydrocarbyl characteristics and properties of the group. Nevertheless, the hydrocarbyl groups usually will be free from non-hydrocarbon groups; that is, they will be purely hydrocarbyl groups consisting of only carbon and hydrogen atoms.

The term "lower" as used in the present specification and claims, when used in conjunction with terms such as alkyl, alkenyl, alkoxy, and the like, is intended to describe such groups which contain a total of up to about 7 carbon atoms.

(A): Neutral and Basic Metal Salts of Acidic Organic Compounds

The terms "neutral" and "normal" as applied to metal salts herein refer to metal salts of organic acids wherein the acid is reacted with a stoichiometric amount of a metal base.

The terms "overbased", "superbased", and "hyperbased", are terms of art which are generic to well known classes of metal-containing materials. These overbased materials have also been referred to as "complexes", "metal complexes", "high-metal containing salts", and the like. Overbased materials are characterized by a metal content in excess of that which would be present according to the stoichiometry of the metal and the particular organic compound reacted with the metal, e.g., a carboxylic or sulfonic acid. Thus, if a monosulfonic acid,

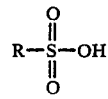

is neutralized with a basic metal compound, e.g., calcium hydroxide, the "normal" metal salt produced will contain one equivalent of calcium for each equivalent of acid, i.e.,

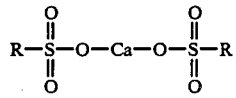

However, as is well known in the art, various processes are available which result in an inert organic liquid solution of a product containing more than the stoichiometric amount of metal. The solutions of these products are referred to herein as overbased materials. Following these procedures, the sulfonic acid or an alkali or alkaline earth metal salt thereof can be reacted with a metal base and the product will contain an amount of metal in excess of that necessary to neutralize the acid, for example, 4.5 times as much metal as present in the normal salt which is a metal excess of 3.5 equivalents. The actual stoichiometric excess of metal can vary considerably, for example, from about 0.1 equivalent to about 30 or more equivalents depending on the reactions, the process conditions, and the like. The overbased materials useful in preparing the disperse systems of the invention will generally contain from about 3.5 to about 40 or more equivalents of metal for each equivalent of material which is overbased.

In the present specification and claims the term "overbased" is used to designate materials containing a stoichiometric excess of metal and is, therefore, inclusive of those materials which have been referred to in the art as overbased, superbased, hyperbased, etc., as discussed supra.

The terminology "metal ratio" is used in the prior art and herein to designate the ratio of the total chemical equivalents of the metal in the overbased material (e.g., a metal sulfonate, carboxylate, phosphate or phenate) to the chemical equivalents of the metal in the product which would be expected to result in the reaction between the organic material to be overbased (e.g., sulfonic, carboxylic, or phosphorus acid or a phenol) and the metal-containing reactant (e.g., calcium hydroxide, barium oxide, etc.) according to the known chemical reactivity and stoichiometry of the two reactants. Thus, in the normal calcium sulfonate discussed above, the metal ratio is one, and in the overbased sulfonate, the metal ratio is 4.5. Obviously, if there is present in the material to be overbased more than one compound capable of reacting with the metal, the "metal ratio" of the product will depend upon whether the number of equivalents of metal in the overbased product is compared to the number of equivalents expected to be present for a given single component or a combination of all such components.

The neutral metal salts which are useful as component (A) in this invention may be metal salts of various organic acidic compounds such as phosphorus acids, thiophosphorus acids, sulfur acids, carboxylic acids, thiocarboxylic acids, phenols and the like. Preferred neutral metal salts are the salts of organic carboxylic and sulfonic acids such as described below as being useful in the preparation of the basic metal salts. Similarly, the metal of the neutral metal salts may be any of the metals described below with respect to the basic metal salts including the alkali and alkaline earth metals, zinc, lead, manganese, etc.

The preparation of neutral metal salts of various organic acids is well known in the art, and many neutral metal salts are available commercially. Examples include neutral barium and calcium mahogany sulfonate, neutral barium and calcium naphthenates and dialkyl-substituted naphthenates, etc.

The overbased materials useful as component (A) and in the formation of component (B) generally are prepared by treating a reaction mixture comprising the organic acidic material to be overbased, a reaction medium consisting essentially of at least one inert, organic solvent for said organic material, a stoichiometric excess of a metal base, a promoter and an acidic material. The methods for preparing the overbased materials as well as an extremely diverse group of overbased materials are well known in the prior art and are disclosed for example in the following U.S. Pat. Nos.: 2,616,904; 2,616,905; 2,616,906; 2,616,911; 2,616,924; 2,616,925; 2,617,049; 2,695,910; 2,723,234; 2,723,235; 2,723,236; 2,760,970; 2,767,164; 2,767,209; 2,777,874; 2,798,852; 2,839,470; 2,856,359; 2,859,360; 2,856,361; 2,861,951; 2,883,340; 2,915,517; 2,959,551; 2,968,642; 2,971,014; 2,989,463; 3,001,981; 3,027,325; 3,070,581; 3,108,960; 3,147,232; 3,133,019; 3,146,201; 3,152,991; 3,155,616; 3,170,880; 3,170,881; 3,172,855; 3,194,823; 3,223,630; 3,232,883; 3,242,079; 3,242,080; 3,250,710; 3,256,186; 3,274,135; 3,492,231; and 4,230,586. These patents disclose processes, materials which can be overbased, suitable metal bases, promoters, and acidic materials, as well as a variety of specific overbased products useful as component (A) and in producing the disperse systems of this invention (component (B)) and are, accordingly, incorporated herein by reference.

An important characteristic of the organic materials which are overbased is their solubility in the particular reaction medium utilized in the overbasing process. As the reaction medium used previously has normally comprised petroleum fractions, particularly mineral oils, these organic materials have generally been oil-soluble. However, if another reaction medium is employed (e.g., aromatic hydrocarbons, aliphatic hydrocarbons, kerosene, etc.) it is not essential that the organic material be soluble in mineral oil as long as it is soluble in the given reaction medium. Obviously, many organic materials which are soluble in minerals oils will be soluble in many of the other indicated suitable reaction mediums. It should be apparent that the reaction medium usually becomes the disperse medium of the colloidal disperse system or at least a component thereof depending on whether or not additional inert organic liquid is added as part of the reaction medium or the disperse medium.

Materials which can be overbased are generally oil-soluble organic acidic compounds including phosphorus acids, thiophosphorus acids, sulfur acids, carboxylic acids, thiocarboxylic acids, phenols and the like, as well as the corresponding alkali and alkaline earth metal salts thereof. Representative examples of each of these classes of organic acids as well as other organic acids, e.g., nitrogen acids, arsenic acids, etc. are disclosed along with methods of preparing overbased products therefrom in the above cited patents which are, accordingly, incorporated herein by reference. More particularly, U.S. Pat. No. 2,777,874 discloses organic acids suitable for preparing overbased materials which can be converted to disperse systems for use in the compositions of the invention. Similarly, U.S. Pat. Nos. 2,616,904; 2,695,910; 2,767,164; 2,767,209; 3,147,232; and 3,274,135 disclose a variety of organic acids suitable for preparing overbased materials as well as representative examples of overbased products prepared from such acids. Overbased acids wherein the acid is a phosphorus acid, a thiophosphorus acid, phosphorus acidsulfur acid combination, and sulfur acid prepared from polyolefins are disclosed in U.S. Pat. Nos. 2,883,340; 2,915,517; 3,001,981; 3,108,960; and 3,232,883. Overbased phenates are disclosed in U.S. Pat. No. 2,959,551 while overbased ketones are disclosed in U.S. Pat. No. 2,798,852. A variety of overbased materials derived from oil-soluble metal-free, non-tautomeric neutral and basic organic polar compounds such as esters, amines, amides, alcohols, ethers, sulfides, sulfoxides, and the like are disclosed in U.S. Pat. Nos. 2,968,642; 2,971,014; and 2,989,463. Another class of materials which can be overbased are the oil-soluble, nitro-substituted aliphatic hydrocarbons, particularly nitro-substituted polyolefins such as polyethylene, polypropylene, polyisobutylene, etc. Materials of this type are illustrated in U.S. Pat. No. 2,959,551. Likewise, the oil-soluble reaction product of alkylene polyamines such as propylene diamine or N-alkylated propylene diamine with formaldehyde or formaldehyde producing compound (e.g., paraformaldehyde) can be overbased. Other compounds suitable for overbasing are disclosed in the above-cited patents or are otherwise well-known in the art.

The sulfonic acids are preferred for use in the preparation of components (A) and (B). They include those represented by the formulae $R^1(SO_3H)_r$ and $(R^2)_xT(SO_3H)_y$. In these formulae, $R^1$ is an aliphatic or aliphatic-substituted cycloaliphatic hydrocarbon or essentially hydrocarbon group free from acetylenic unsaturation and containing up to about 60 carbon atoms. When $R^1$ is aliphatic, it usually contains at least about 15 carbon atoms; when it is an aliphatic-substituted cycloaliphatic group, the aliphatic substituents usually contain a total of at least about 12 carbon atoms. Examples of $R^1$ are alkyl, alkenyl and alkoxyalkyl groups, and aliphatic-substituted cycloaliphatic groups wherein the aliphatic substituents are alkyl, alkenyl, alkoxy, alkoxyalkyl, carboxyalkyl and the like. Generally, the cycloaliphatic nucleus is derived from a cycloalkane or a cycloalkene such as cyclopentane, cyclohexane, cyclohexene or cyclopentene. Specific examples of $R^1$ are cetylcyclohexyl, laurylcyclohexyl, cetyloxyethyl, octadecenyl, and radicals derived from petroleum, saturated and unsaturated paraffin wax, and olefin polymers including polymerized monoolefins and diolefins containing about 2 to 8 carbon atoms per olefinic monomer unit. $R^1$ can also contain other substituents such as phenyl, cycloalkyl, hydroxy, mercapto, halo, nitro, amino, nitroso, lower alkoxy, lower alkylmercapto, carboxy, carbalkoxy, oxo or thio, or interrupting groups such as —NH—, —O— or —S—, as long as the essentially hydrocarbon character thereof is not destroyed.

$R^2$ is generally a hydrocarbon or essentially hydrocarbon group free from acetylenic unsaturation and containing from about 4 to about 60 aliphatic carbon atoms, preferably an aliphatic hydrocarbon radical such as alkyl or alkenyl. It may also, however, contain substituents or interrupting groups such as those enumerated above provided the essentially hydrocarbon character thereof is retained. In general, any noncarbon atoms present in $R^1$ or $R^2$ do not account for more than 10% of the total weight thereof.

The radical T is a cyclic nucleus which may be derived from an aromatic hydrocarbon such as benzene, naphthalene, anthracene or biphenyl, or from a heterocyclic compound such as pyridine, indole or isoindole. Ordinarily, T is an aromatic hydrocarbon nucleus, especially a benzene or naphthalene nucleus.

The subscript x is at least 1 and is generally 1–3. The subscripts r and y have an average value of about 1–4 per molecule and are generally also 1.

Illustrative sulfonic acids useful in the preparation of components (A) and (B) are mahogany sulfonic acids, petrolatum sulfonic acids, mono- and polywax-substituted naphthalene sulfonic acids, cetylchlorobenzene sulfonic acids, cetylphenol sulfonic acids, cetylphenol disulfide sulfonic acids, cetoxycapryl benzene sulfonic acids, dicetyl thianthrene sulfonic acids, dilauryl Betanaphthol sulfonic acids, dicapryl nitronaphthalene sulfonic acids, saturated paraffin wax sulfonic acids, unsaturated paraffin wax sulfonic acids, hydroxy-substituted paraffin wax sulfonic acids, tetraisobutylene sulfonic acids, tetraamylene sulfonic acids, chloro-substituted paraffin wax sulfonic acids, nitroso-substituted paraffin wax sulfonic acids, petroleum naphthene sulfonic acids, cetylcyclopentyl sulfonic acids, lauryl cyclohexyl sulfonic acids, mono- and polywax-substituted cyclohexyl sulfonic acids, postdodecylbenzene sulfonic acids, "dimer alkylate" sulfonic acids, and the like. These sulfonic acids are well-known in the art and require no further discussion herein.

One type of preferred sulfonic acid may be represented by the formula

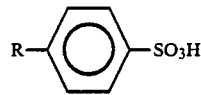

wherein R is a hydrocarbyl group of about 12 to about 30 carbon atoms.

Suitable carboxylic acids include aliphatic, cycloaliphatic and aromatic mono- and polybasic carboxylic acids free from acetylenic unsaturation, including naphthenic acids, alkyl- or alkenyl-substituted cyclopentanoic acids, alkyl- or alkenyl-substituted cyclohexanoic acids, and alkyl- or alkenyl-substituted aromatic carboxylic acids. The aliphatic acids generally contain from about 8 to about 50, and preferably from about 12 to about 25 carbon atoms. The cycloaliphatic and aliphatic carboxylic acids are preferred, and they can be saturated or unsaturated. Specific examples include 2-ethylhexanoic acid, linolenic acid, propylene tetramer-substituted maleic acid, behenic acid, isostearic acid, pelargonic acid, capric acid, palmitoleic acid, linoleic acid, lauric acid, oleic acid, ricinoleic acid, undecyclic acid, dioctylcyclopentanecarboxylic acid, myristic acid, dilauryldecahydronaphthalene-carboxylic acid, stearyl-octahydroindenecarboxylic acid, palmitic acid, alkyl- and alkenyl succinic acids, acids formed by oxidation of petrolatum or of hydrocarbon waxes, and commercially available mixtures of two or more carboxylic acids, such as tall oil acids, rosin acids, and the like.

The pentavalent phosphorus acids useful in the preparation of components (A) and (B) may be represented by the formula

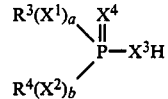

wherein each of $R^3$ and $R^4$ is hydrogen or a hydrocarbon or essentially hydrocarbon group preferably having from about 4 to about 25 carbon atoms, at least one of $R^3$ and $R^4$ being hydrocarbon or essentially hydrocarbon; each of $X^1$, $X^2$, $X^3$ and $X^4$ is oxygen or sulfur; and each of a and b is 0 or 1. Thus, it will be appreciated that the phosphorus acid may be an organophosphoric, phosphonic or phosphinic acid, or a thio analog of any of these.

Usually, the phosphorus acids are those of the formula

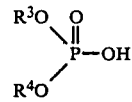

wherein $R^3$ is a phenyl group or preferably an alkyl group having up to 18 carbon atoms, and $R^4$ is hydrogen or a similar phenyl or alkyl group. Mixtures of such phosphorus acids are often preferred because of their ease of preparation.

Components (A) and (B) may also be prepared from phenols; that is, compounds containing a hydroxy group bound directly to an aromatic ring. The term "phenol" as used herein includes compounds having more than one hydroxy group bound to an aromatic ring, such as catechol, resorcinol and hydroquinone. It also includes alkyl phenols such as the cresols and ethyl phenols, and alkenyl phenols. Preferred are phenols containing at least one alkyl substituent containing about 3 to 100 and especially about 6 to 50 carbon atoms, such as heptyl phenol, octyl phenol, dodecyl phenol, tetrapropene alkylated phenol, octadecyl phenol and polybutenyl phenols. Phenols containing more than one alkyl substituent may also be used, but the monoalkyl phenols are preferred because of their availability and ease of production.

Also useful are condensation products of the above-described phenols with at least one lower aldehyde, the term "lower" denoting aldehydes containing not more than 7 carbon atoms. Suitable aldehydes include formaldehyde, acetaldehyde, propionaldehyde, the butyraldehydes, the valeraldehydes and benzaldehyde. Also suitable are aldehyde-yielding reagents such as paraformaldehyde, trioxane, methylol, Methyl Formcel and paraldehyde. Formaldehyde and the formaldehyde-yielding reagents are especially preferred.

The equivalent weight of the acidic organic compound is its molecular weight divided by the number of acidic groups (i.e., sulfonic acid, carboxy or acidic hydroxy groups) present per molecule.

The organic liquids used as solvents for the overbasing reaction may be any of the liquids useful as the disperse medium (B-2) in the colloidal disperse system (B). The identity of the solvent is not a particularly critical aspect of the invention. The solvent can have components characterized by relatively low boiling point, e.g., in the range of about 25° to about 120° C. to facilitate subsequent removal of a portion or substantially all of the liquid from the compositions of the invention, or the components can have a higher boiling point to protect against removal from such compositions upon standing or heating. There is no criticality in an upper boiling point limitation on these liquids.

Representative solvents include mineral oils, the alkanes and haloalkanes of about 5 to about 18 carbon atoms, polyhalo- and perhaloalkanes of up to about 6 carbons, the cycloalkanes of about 5 or more carbons, the corresponding alkyl- and/or halo-substituted cycloalkanes, the aryl hydrocarbons, the alkylaryl hydrocarbons, the haloaryl hydrocarbons, ethers such as dialkyl ethers, alkyl aryl ethers, cycloalkyl ethers, cycloalkylalkyl ethers, alkanols, alkylene glycols, polyalkylene glycols, alkyl ethers of alkylene glycols and polyalkylene glycols, dibasic alkanoic acid diesters, silicate esters, and mixtures of these. Specific examples include petroleum ether, Stoddard Solvent, pentane, hexane, octane, isooctane, undecane, tetradecane, cyclopentane, cyclohexane, isopropylcyclohexane, 1,4-dimethylcyclohexane, cyclooctane, benzene, toluene, xylene, ethyl benzene, tert-butyl-benzene, halobenzenes especially mono- and polychlorobenzenes such as chlorobenzene per se and 3,4-dichlorotoluene, mineral oils, n-propylether, isopropylether, isobutylether, n-amylether, methyl-n-amylether, cyclohexylether, ethoxycyclohexane, methoxybenzene, isopropoxybenzene, p-methoxytoluene, methanol, ethanol, propanol, ispropanol, hexanol, n-octyl alcohol, n-decyl alcohol, alkylene glycols such as ethylene glycol and propylene glycol, diethyl ketone, dipropyl ketone, methylbutyl ketone, acetophenone, 1,2-difluoro-tetrachloroethane, dichlorofluoromethane, 1,2-dibromotetrafluoroethane, trichlorofluoromethane, 1-chloropentane, 1,3-dichlorohexane, formamide, dimethylformamide, acetamide, dimethylacetamide, diethylacetamide, propionamide, diisooctyl azelate, polyethylene glycols, polypropylene glycols, hexa-2-ethylbutoxy disiloxane, etc.

Also useful as solvents are the low molecular weight, liquid polymers, generally classified as oligomers, which include the dimers, tetramers, pentamers, etc. Illustrative of this large class of materials are such liquids as the propylene tetramers, isobutylene dimers, and the like.

The alkyl, cycloalkyl, and aryl hydrocarbons represent a preferred class of solvents. Liquid petroleum fractions represent another preferred class of solvents. Included within these preferred classes are benzenes and alkylated benzenes, cycloalkanes and alkylated cycloalkanes, cycloalkenes and alkylated cycloalkenes such as found in naphthene-based petroleum fractions, and the alkanes such as found in the paraffin-based petroleum fractions. Petroleum ether, naphthas, mineral oils, Stoddard Solvent, toluene, xylene, etc., and mixtures thereof are examples of economical sources of suitable inert organic liquids which can function as the solvent in the preparation of the overbased component of the present invention. Mineral oil can serve by itself as the solvent.

The metal compounds used in preparing the overbased materials are normally the basic salts of metals in Group I-A and Group II-A of the Periodic Table although other metals such as lead, zinc, manganese, etc. can be used in the preparation of overbased materials. The anionic portion of the salt can be hydroxyl, oxide, carbonate, hydrogen carbonate, nitrate, sulfite, hydrogen sulfite, halide, amide, sulfate etc. as disclosed in the above-cited patents. Preferred overbased materials are prepared from the alkaline earth metal oxides, hydroxides, and alcoholates such as the alkaline earth metal oxides, hydroxides, and alcoholates such as the alkaline earth metal lower alkoxides. Preferred disperse systems of the invention are made from overbased materials containing calcium as the metal.

The promoters, that is, the materials which permit the incorporation of the excess metal into the overbased material, are also quite diverse and well known in the art as evidenced by the above-cited patents. A particularly comprehensive discussion of suitable promoters is found in U.S. Pat. Nos. 2,777,874; 2,695,910; and 2,616,904. These include the alcoholic and phenolic promoters. The alcoholic promoters include the alkanols of one to about 12 carbon atoms such as methanol, ethanol, amyl alcohol, octanol, isopropanol, and mixtures of these and the like. Phenolic promoters include a variety of hydroxy-substituted benzenes and naphthalenes. A particularly useful class of phenols are the alkylated phenols of the type listed in U.S. Pat. No. 2,777,874, e.g., heptylphenols, octylphenols, and nonylphenol. Mixtures of various promoters are sometimes used.

Suitable acidic materials are also disclosed in the above cited patents, for example, U.S. Pat. No. 2,616,904. Included within the known group of useful acidic materials are liquid acids such as formic acid, acetic acid, nitric acid, sulfuric acid, hydrochloric acid, hydrobromic acid, carbamic acid, substituted carbamic acids, etc. Acetic acid is a very useful acidic material although inorganic acidic materials such as HCl, $SO_2$, $SO_3$, $CO_2$, $H_2S$, $N_2O_3$, etc. are ordinarily employed as the acidic materials. Preferred acidic materials are carbon dioxide and acetic acid.

In preparing overbased materials, the material to be overbased, an inert non-polar organic solvent therefor, the metal base, the promoter and the acidic material are brought together and a chemical reaction ensues. The exact nature of the resulting overbased product is not known. However, it can be adequately described for purposes of the present specification as a single phase homogeneous mixture of the solvent and (1) either a metal complex formed from the metal base, the acidic material, and the material being overbased and/or (2) an amorphous metal salt formed from the reaction of the acidic material with the metal base and the material which is said to be overbased. Thus, if mineral oil is used as the reaction medium, petrosulfonic acid as the material which is overbased, $Ca(OH)_2$ as the metal base, and carbon dioxide as the acidic material, the resulting overbased material can be described for purposes of this invention as an oil solution of either a metal containing complex of the acidic material, the metal base, and the petrosulfonic acid or as an oil solution of amorphous calcium carbonate and calcium petrosulfonate.

Although no crystalline structure has been observed by X-ray techniques, light scattering techniques indicate particles are present in the overbased materials, and these particles and/or agglomerates have particle sizes in the range of about 100 to about 1500 A.

The temperature at which the acidic material is contacted with the remainder of the reaction mass depends to a large measure upon the promoting agent used. With a phenolic promoter, the temperature usually ranges from about 80° C. to about 300° C., and preferably from about 100° C. to about 200° C. When an alcohol or mercaptan is used as the promoting agent, the temperature usually will not exceed the reflux temperature of the reaction mixture and preferably will not exceed about 100° C.

In view of the foregoing, it should be apparent that the overbased materials may retain all or a portion of the promoter. That is, if the promoter is not volatile (e.g., and alkyl phenol) or otherwise readily removable from the overbased material, at least some promoter remains in the overbased product. Accordingly, the disperse systems (i.e., component (B)) made from such products may also contain the promoter. The presence or absence of the promoter in the overbased material used to prepare the disperse system and likewise, the presence or absence of the promoter in the colloidal disperse systems (B) themselves does not represent a critical aspect of the invention. Obviously, it is within the skill of the art to select a volatile promoter such as a lower alkanol, e.g., methanol, ethanol, etc., so that the promoter can be readily removed prior to incorporation with the compositions of the present invention to forming the disperse system or thereafter.

Within this preferred group of overbased carboxylic and sulfonic acids, the barium and calcium overbased mono-, di-, and tri-alkylated benzene and naphthalene (including hydrogenated forms thereof), petrosulfonic, and higher fatty acids are especially preferred. Illustrative of the synthetically produced alkylated benzene and naphthalene sulfonic acids are those containing alkyl substituents having from about 8 to about 30 carbon atoms, preferably about 12 to about 30 carbon atoms, and advantageously about 24 carbon atoms. Such acids include di-isododecyl-benzene sulfonic acid, wax-substituted phenol sulfonic acid, wax-substituted benzene sulfonic acids, polybutenesubstituted sulfonic acid, cetyl-chlorobenzene sulfonic acid, di-cetylnaphthalene sulfonic acid, di-lauryldiphenylether sulfonic acid, di-isononylbenzene sulfonic acid, di-isooctadecylbenzene sulfonic acid, stearylnaphthalene sulfonic acid, and the like. This especially preferred group of aliphatic fatty acids includes the saturated and unsaturated higher fatty acids containing from about 12 to about 30 carbon atoms. Illustrative of these acids are lauric acid, palmitic acid, oleic acid, linoletic acid, linolenic acid, oleostearic acid, stearic acid, myristic acid, and undecalinic acid, alpha-chlorostearic acid, and alphanitrolauric acid.

The petroleum sulfonic acids are a well known art recognized class of materials which have been used as starting materials in preparing overbased products since the inception of overbasing techniques as illustrated by the above patents. Petroleum sulfonic acids are obtained by treating refined or semi-refined petroleum oils with concentrated or fuming sulfuric acid. These acids remain in the oil after the settling out of sludges. These petroleum sulfonic acids, depending on the nature of the petroleum oils from which they are prepared, are oil-soluble alkane sulfonic acid, alkyl-substituted cycloaliphatic sulfonic acids including cycloalkyl sulfonic acids and cycloalkene sulfonic acids, and alkyl, alkaryl, or aralkyl-substituted hydrocarbon aromatic sulfonic acids including single and condensed aromatic nuclei as well as partially hydrogenated forms thereof. Examples of such petrosulfonic acid include mahogany sulfonic acid, white oil sulfonic acid, petrolatum sulfonic acid, petroleum maphthene sulfonic acid, etc.

As shown by the representative examples of the preferred classes of sulfonic and carboxylic acids, the acids may contain nonhydrocarbon substituents such as halo, nitro, alkoxy, hydroxyl, and the like.

It is desirable that the overbased materials used as component (A) and used to prepare the disperse system (B) have a metal ratio of at least about 2.0 and preferably at least about 4.5. A preferred group of overbased materials has a metal ratio of at least about 7. While overbased materials having a metal ratio of up to about 75 can be used, normally the maximum metal ratio will not exceed about 40 and, in most cases, not more than about 20.

The overbased materials used in the compositions of the invention generally contain from about 10% to about 70% by weight of metal-containing components. As explained hereafter, the exact nature of these metal containing components is not known. While not wishing to be bound by theory, it is believed that the metal base, the acidic material, and the organic material being overbased form a metal complex, this complex being the metal-containing component of the overbased material. On the other hand, it has also been theorized that the metal base and the acidic material form amorphous metal compounds which are dissolved in the inert organic reaction medium and the material which is said to be overbased. The material which is overbased may itself be a metal-containing compound, e.g., a carboxylic or sulfonic acid metal salt. In such a case, the metal containing components of the overbased material would be both the amorphous compounds and the acid salt. The remainder of the overbased materials consist essentially of the inert organic reaction medium and any promoter which is not removed from the overbased product. For purposes of this application, the organic material which is subjected to overbasing is considered a part of the metal-containing components. Normally, the liquid reaction medium constitutes at least about 30% by weight of the reaction mixture utilized to prepare the overbased materials.

(B): The Non-Newtonian Disperse Systems

The terminology "disperse system" as used in the specification and claims is a term of art generic to colloids or colloidal solutions, e.g., "any homogenous medium containing dispersed entities of any size and state," Jirgensons and Straumanis, "A Short Textbook on Colloidal Chemistry" (2nd Ed.) The Macmillan Co., New York, 1962 at page 1. However, the particular disperse systems of the present invention form a subgenus within this broad class of disperse system, this subgenus being characterized by several important features.

This subgenus comprises those disperse systems wherein at least a portion of the particles dispersed therein are solid, metal-containing particles formed in situ. At least about 10% to about 50% are particles of this type and preferably, substantially all of said solid particles are formed in situ.

So long as the solid particles remain dispersed in the dispersing medium as colloidal particles the particle size is not critical. Ordinarily, the particles will not exceed about 5000 A. (The abbreviation "A" herein refers to angstroms.) It has been observed that determination of the size of the particles depends on the technique used. For example, when X-ray techniques are used to observe and measure the unit particle, the particles in the disperse systems (B) are generally in the range of 50 to about 1000 A. When the same disperse systems are examined by light scattering, particle sizes appear in the range of from about 500 up to about 3000 A. It is preferred that the maximum unit particle size be less than about 3000 A. In a particularly preferred aspect of the invention, the unit particle size (X-ray) is less than about 500 A. Systems having a unit particle size in the range of about 50 A. to 300 A. give excellent results. The minimum unit particle size is generally at least about 20 A. and preferably at least about 30 A.

The language "unit particle size" is intended to designate the average particle size of the solid, metal-containing particles assuming maximum dispersion of the individual particles throughout the disperse medium. That is, the unit particle is that particle which corresponds in size to the average size of the metal-containing particles and is capable of independent existence within the disperse system as a discrete colloidal particle. These metal-containing particles are found in two forms in the disperse systems. Individual unit particles can be dispersed as such throughout the medium or unit particles can form an agglomerate, in combination with other materials (e.g., another metal-containing particle, the disperse medium, etc.) which are present in the disperse systems. These agglomerates are dispersed through the system as "metal containing particles". Obviously, the "particle size" of the agglomerate is substantially greater than the unit particle size. Furthermore, it is equally apparent that this agglomerate size is subject to wide variations, even within the same disperse system. The agglomerate size varies, for example, with the degree of shearing action employed in dispersing the unit particles. That is, mechanical agitation of the disperse system tends to break down the agglomerates into the individual components thereof and disperse these individual components through the disperse medium. The ultimate in dispersion is achieved when each solid, metal-containing particle is individually dispersed in the medium. Accordingly, the disperse systems are characterized with reference to the unit particle size, it being apparent to those skilled in the art that the unit particle size represents the average size of solid, metal-containing particles present in the system which can exist independently.

(B-1): Solid Metal-Containing Colloidal Particles

The colloidal disperse systems (B) of the compositions of this invention contain solid metal-containing colloidal particles.

Generally, the solid-containing particles are in the form of metal salts of inorganic acids, and low molecular weight organic acids, hydrates thereof, or mixtures of these. These salts are usually the alkali and alkaline earth metal formates, acetates, carbonates, hydrogen carbonates, hydrogen sulfides, sulfites, hydrogen sulfites, and halides, particularly chlorides. In other words, the metal-containing particles are ordinarily particles of metal salts, the unit particle is the individual salt particle and the unit particle size is the average particle size of the salt particles which is readily ascertained, as for example, by conventional X-ray diffraction techniques. Colloidal disperse systems possessing particles of this type are sometimes referred to as macromolecular colloidal systems. Because of the composition of the colloidal disperse systems of this invention, the metal-containing particles also exist as components in micellar colloidal particles.

The average particle size of the metal-containing solid particles in the system can be made to approach the unit particle size value by the application of a shearing action to the existent system or during the formation of the disperse system as the particles are being formed in situ. It is not necessary that maximum particle dispersion exist to have useful disperse systems. The agitation associated with homogenization of the overbased material and conversion agent produces sufficient particle dispersion.

(B-2): Liquid Dispersing Medium

The second component of the colloidal disperse system is the dispersing medium. The identity of the medium is not a particularly critical aspect of the invention as the medium primarily serves as the liquid vehicle in which solid particles are dispersed. The medium can have components characterized by relatively low boiling point, e.g., in the range of about 25° to about 120° C. to facilitate subsequent removal of a portion or substantially all of the medium from the compositions of the invention or the components can have a higher boiling point to protect against removal from such compositions upon standing or heating. There is no criticality in an upper boiling point limitation on these liquids. Any of the liquids described above as being useful as solvents in the preparation of the overbased metal salts (component (A)) may be used as the liquid dispersing medium (B-2).

The alkyl, cycloalkyl, and aryl hydrocarbons represent a preferred class of disperse mediums. Liquid petroleum fractions represent another preferred class of disperse mediums. Included within these preferred classes are benzenes and alkylated benzenes, cycloalkanes and alkylated cycloalkanes, cycloalkenes and alkylated cycloalkenes such as found in naphthene-based petroleum fractions, and the alkanes such as found in the paraffin-based petroleum fractions. Petroleum ether, naphthas, mineral oils, Stoddard Solvent, toluene, xylene, etc., and mixtures thereof are examples of economical sources of suitable inert organic liquids which can function as the disperse medium in the colloidal disperse systems of the present invention. Mineral oil can serve by itself as the disperse medium.

(B-3): Soluble Organic Compound

In addition to the solid metal-containing particles and the disperse medium, the colloidal disperse systems of the invention are characterized by a third component, one which is soluble in the medium and contains in the molecules thereof a hydrophobic portion and at least one polar substituent. This third component can orient itself along the external surfaces of the above metal salts, the polar groups lying along the surface of these salts with the hydrophobic portions extending from the salts into the disperse medium forming micellar colloidal particles. These micellar colloids are formed through weak intermolecular forces, e.g., Van de Waals forces, etc. Micellar colloids represent a type of agglomerate particle as discussed hereinabove. Because of the molecular orientation in these micellar colloidal particles, such particles are characterized by a metal-containing layer (i.e., the solid metal-containing particles and any metal present in the polar substituent of the third component, such as the metal in a sulfonic or carboxylic acid salt group), a hydrophobic layer formed by the hydrophobic portions of the molecules of the third component and a polar layer bridging said metal-containing layer and said hydrophobic layer, said polar bridging layer comprising the polar substituents of the third component of the system, e.g., the

group if the third component is an alkaline earth metal sulfonate.

The organic compounds suitable as component (B-3) are extremely diverse. These compounds are inherent constituents of the disperse systems as a result of the methods used in preparing the systems from overbased materials. Since the disperse system, as described below is prepared from overbased materials, component (B-3) will be one or more of the organic acidic materials described above as being useful in preparing the overbased metal salts (A).

Preparation of the Non-Newtonian Disperse Systems

Broadly speaking, the colloidal disperse systems of the invention are prepared by treating a single phase homogeneous, Newtonian system of an overbased compound (described above as component (A)) with a conversion agent, usually an active hydrogen containing compound, the treating operation being simply a thorough mixing together of the two components, i.e., homogenization. This treatment converts these single phase systems into the non-Newtonian colloidal disperse systems utilized in the compositions of the present invention.

Homogenization is achieved by vigorous agitation of the two components, preferably at the reflux temperature or a temperature slightly below the reflux temperaure. The reflux temperature normally will depend upon the boiling point of the conversion agent. However, homogenization may be achieved within the range of about 25° C. to about 200° C. or slightly higher. Usually, there is no real advantage in exceeding about 150° C.

The concentration of the conversion agent necessary to achieve conversion of the overbased material is usually within the range of from about 1% to about 80% based upon the weight of the overbased material excluding the weight of the inert, organic solvent and any promoter present therein. Preferably at least about 10% and usually less than about 60% by weight of the conversion agent is employed. Concentrations beyond about 60% appear to afford no additional advantages.

The terminology "conversion agent" as used herein is intended to describe a class of very diverse materials which possess the property of being able to convert the Newtonian homogeneous, single-phase, over-based materials into non-Newtonian colloidal disperse systems. The mechanism by which conversion is accomplished is not completely understood. However, with the exception of carbon dioxide, these conversion agents all possess active hydrogens. The conversion agents include lower aliphatic carboxylic acids, water, aliphatic alcohols, cycloaliphatic alcohols, arylaliphatic alcohols, phenols, ketones, aldehydes, amines, boron acids, phosphorus acids, and carbon dioxide. Mixtures of two or more of these conversion agents are also useful. Particularly useful conversion agents are discussed below.

The lower aliphatic carboxylic acids are those containing less than about 8 carbon atoms in the molecule. Examples of this class of acids are formic acid, acetic acid, propionic acid, butyric acid, valeric acid, isovaleric acid, isobutyric acid, caprylic acid, heptanoic acid, chloroacetic acid, dichloroacetic acid, trichloroacetic acid, etc. Formic acid, acetic acid, and propionic acid, are preferred with acetic acid being especially suitable. It is to be understood that the anhydrides of these acids are also useful and, for the purposes of the specification and claims of this invention, the term acid is intended to include both the acid per se and the anhydride of the acid.

Useful alcohols includes aliphatic, cycloaliphatic, and arylaliphatic mono- and polyhydroxy alcohols. Alcohols having less than about 12 carbons are especially useful while the lower alkanols, i.e., alkanols having less than about 8 carbon atoms are preferred for reasons of economy and effectiveness in the process. Illustrative are the alkanols such as methanol, ethanol, isopropanol, n-propanol, isobutanol, tertiary butanol, isooctanol, dodecanol, n-pentanol, etc.; cycloalkyl alcohols exemplified by cyclopenthanol, cyclohexanol, 4-methylcyclohexanol, 2-cyclohexylethanol, cyclopentylmethanol, etc.; phenyl aliphatic alkanols such as benzyl alcohol, 2-phenylethanol, and cinnamyl alcohol; alkylene glycols of up to about 6 carbon atoms and mono-lower alkyl ethers thereof such as monomethylether of ethylene glycol, diethylene glycol, ethylene glycol, trimethylene glycol, hexamethylene glycol, triethylene glycol, 1,4-butanediol, 1,4-cyclohexanediol, glycerol, and pentaerythritol.

The use of a mixture of water and one or more of the alcohols is especially effective for converting the overbased material to colloidal disperse systems. Such combinations often reduce the length of time required for the process. Any water-alcohol combination is effective but a very effective combination is a mixture of one or more alcohols and water in a weight ratio of alcohol to water of from about 0.05:1 to about 24:1. Preferably, at least one lower alkanol is present in the alcohol component of these water-alkanol mixtures. Water-alkanol mixtures wherein the alcoholic portion is one or more lower alkanols are especially suitable.

Phenols suitable for use as conversion agents include phenol, naphthol, ortho-cresol, para-cresol, catechol, mixtures of cresol, para-tert-butylphenol, and other lower alkyl substituted phenols, meta-polyisobutene (M.W.-350)-substituted phenol, and the like.

Other useful conversion agents include lower aliphatic aldehydes and ketones, particularly lower alkyl aldehydes and lower alkyl ketones such as acetaldehydes, propionaldehydes, butyraldehydes, acetone, methylethyl ketone, diethyl ketone. Various aliphatic, cycloaliphatic, aromatic, and heterocyclic amines are also useful providing they contain at least one amino group having at least one active hydrogen attached thereto. Illustrative of these amines are the mono- and di-alkylamines, particularly mono- and di-lower alkylamines, such as methylamine, ethylamine, propylamine, dodecylamine, methyl ethylamine, diethylamine; the cycloalkylamines such as cyclohexylamine, cyclopentylamine, and the lower alkyl substituted cycloalkylamines such as 3-methylcyclohexylamine; 1,4-cyclohexylenediamine; arylamines such as aniline, mono-, di-, and tri-, lower alkyl-substituted phenyl amines, naphthylamines, 1,4-phenylene diamines; lower alkanol amines such as ethanolamine and diethanolamine; alkylenediamines such as ethylene diamine, triethylene tetramine, propylene diamines, octamethylene diamines; and heterocyclic amines such as piperazine, 4-aminoethylpiperazine, 2-octadecyl-imidazoline, and oxazolidine. Boron acids are also useful conversion agents and include boronic acids (e.g., alkyl-B(OH)$_2$ or aryl-B(OH$_2$)), boric acid (i.e., H$_3$BO$_3$), tetraboric acid, metaboric acid, and esters of such boron acids.

The phosphorus acids are useful conversion agents and include the various alkyl and aryl phosphinic acids, phosphinus acids, phosphonic acids, and phosphonous acids. Phosphorus acids obtained by the reaction of lower alkanols or unsaturated hydrocarbons such as polyisobutenes with phosphorus oxides and phosphorus sulfides are particularly useful, e.g., P$_3$O$_5$ and P$_2$S$_5$.

Carbon dioxide can be used as the conversion agent. However, it is preferable to use this conversion agent in combination with one or more of the foregoing conversion agents. For example, the combination of water and carbon dioxide is particularly effective as a conversion agent for transforming the overbased materials into a colloidal disperse system.

As previously mentioned, the overbased materials (A) are single phase homogeneous systems. However, depending on the reaction conditions and the choice of reactants in preparing the overbased materials, insoluble contaminants sometimes are present in the product. These contaminants are normally unreacted basic materials such as calcium oxide, barium oxide, calcium hydroxide, barium hydroxide, or other metal base materials used as a reactant in preparing the overbased material. It has been found that a more uniform colloidal disperse system results if such contaminants are removed prior to homogenizing the overbased material with the conversion agents. Accordingly, it is preferred that any insoluble contaminants in the overbased materials be removed prior to converting the material in the colloidal disperse system. The removal of such contaminants is easily accomplished by conventional techniques such as filtration or centrifugation. It should be understood, however, that the removal of these contaminants, while desirable for reasons just mentioned, is not an absolute essential aspect of the invention and useful products can be obtained when overbased materials containing insoluble contaminants are converted to the colloidal disperse systems.

The conversion agents or a proportion thereof may be retained in the colloidal disperse system. The conversion agents are however, not essential components of these disperse systems and it is usually desirable that as little of the conversion agents as possible be retained in the disperse systems. Since these conversion agents do not react with the overbased material in such a manner as to be permanently bound thereto through some type of chemical bonding, it is normally a simple matter to remove a major proportion of the convertion agents and, generally, substantially all of the conversion agents. Some of the conversion agents have physical properties which make them readily removable from the disperse systems. Thus, most of the free carbon dioxide gradually escapes from the disperse system during the homogenization process or upon standing thereafter. Since the liquid conversion agents are generally more volatile than the remaining components of the disperse system, they are readily removalbe by conventional devolatilization techniques, e.g., heating, heating at reduced pressures, and the like. For this reason, it may be desirable to select conversion agents which will have boiling points which are lower than the remaining components of the disperse system. This is another reason why the lower alkanols, mixtures thereof, and lower alkanol-water mixtures are preferred conversion agents.

Again, it is not essential that all of the conversion agent be removed from the disperse systesm. In fact, useful disperse systems for employment in the compositions of the invention result without removal of the conversion agents. However, from the standpoint of achieving uniform results, it is generally desirable to remove the conversion agents, particularly where they are volatile. In some cases, the liquid conversion agents may facilitate the mixing of the colloidal disperse system with the other components of the compositions of the invention. In such cases, it is advantageous to permit the conversion agents to remain in the disperse system until it is mixed with such components. Thereafter, the conversion agents can be removed from such compositions by conventional volatilization techniques if desired.

The disperse systems are characterized by three essential components: (B-1) solid, metal-containing particles, (B-2) an inert, non-polar, organic liquid which functions as the disperse medium, and (B-3) an organic compound which is soluble in the disperse medium and the molecules of which are characterized by a hydrophobic portion and at least one polar substituent. In a preferred system component (B-1) comprises solid calcium carbonate colloidal particles having a unit particle size in the range of about 50A to about 500A; component (B-2) is an aromatic solvent; and component (B-3) is a calcium petroleum sulfonate, and more particularly a sulfonate represented by the formula

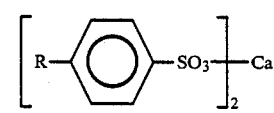

wherein R is a hydrocarbyl group having an average of about 12 to about 30 carbon atoms, preferably about 20 to about 28 carbon atoms, more preferably about 24 carbon atoms. The molar ratio of (B-1) to (B-3) preferably is in the range of from about 40:1 to about 2:1.

The solid, metal-containing particles formed in situ possess the same chemical composition as would the reaction products of the metal base and the acidic material used in preparing the overbased materials. Thus, the actual chemical identify of the metal containing particles formed in situ depends upon both the particle metal base or bases employed and the particular acidic material or materials reacted therewith. For example, if the metal base used in preparing the overbased material is barium oxide, and if the acidic material is a mixture of formic and acetic acids, the metal-containing particles formed in situ would be barium formates and barium acetates.

However, the physical characteristics of the particles formed in situ in the conversion step are quite different from the physical characteristics of any particles present in the homogeneous, single-phase overbased material which is subjected to the conversion. Particularly, such physical characteristics as particle size and structure are quite different. The solid, metal-containing particles of the colloidal disperse systems are of a size sufficient for detection by X-ray diffraction. The overbased material prior to conversion are not characterized by the presence of these detectable particles.

X-ray diffraction and electron microscope studies have been made of both overbased organic materials and colloidal disperse systems prepared therefrom. These studies establish the presence in the disperse systems of the solid metal-containing salts. For example, in one disperse system that has been prepared, calcium carbonate is present as solid calcium carbonate having a particle size of about 40 to 50 A (unit particle size) and interplanar spacing (dA.) of 3.035. But X-ray diffraction studies of the overbased material from which it was prepared indicate the absence of calcium carbonate of this type. In fact, calcium carbonate present as such, if any, appears to be amorphous and in solution. While not wishing to be bound by theory, it appears that conversion permits particle formation and growth. That is, the amorphous, metal-containing apparently dissolved salts or complexes present in the overbased material form solid, metal-containing particles which by a process of particle growth become colloidal particles. In many cases, these particles apparently are crystallites. Regardless of the correctness of the postulated mechanism for in situ particle formation the fact remains that no particles of the type predominant in the disperse systems are found in the overbased materials from which they are prepared. Accordingly, they are formed in situ during conversion.

As these solid metal-containing particles formed in situ come into existence, they do so as pre-wet, pre-dispersed solid particles which are inherently uniformly distributed throughout the other components of the disperse system. The liquid disperse medium containing these pre-wet dispersed particles is readily incorporated into the compositions of the invention thus facilitating the uniform distribution of the particles throughout such compositions. This pre-wet, pre-dispersed character of the solid metal-containing particles resulting from their in situ formation is, thus, an important feature of the disperse systems.

The identity of the third component (B-3) of the disperse system depends upon the identify of the starting material (i.e., the material to be overbased and the metal base compound) used in preparing the overbased material. Once the identify of these starting materials is known, the identify of the third component in the colloidal disperse system is automatically established. Thus, from the identity of the original material, the identify of the hydrophobic portion of the third component in the disperse system is readily established as being the residue of that material minus the polar substituents attached thereto. The identity of the polar substituents on the third component is established as a matter of chemistry. If the polar groups on the material to be overbased undergo reaction with the metal base, for example, if they are acid functions, hydroxy groups, etc., the polar substituent in the final product will correspond to the reaction product of the original substituent and the metal base. On the other hand, if the polar substituent in the material to be overbased is one which does not react with metal bases, then the polar substituent of the third component is the same as the original substituent.

As previously mentioned, this third component can orient itself around the metal-containing particles to form micellar colloidal particles. Accordingly, it can exist in the disperse system as an individual liquid component dissolved in the disperse medium or it can be associated with the metal-containing particles as a component of micellar colloidal particles.

In the preparation of the compositions of the invention it is preferred to reduce the basicity of the non-Newtonian colloidal disperse system sufficiently to provide acceptable shelf life. The basicity of the disperse system preferably is adjusted with a suitable acidic material (e.g., sulfonic acid, carbon dioxide, etc.). The amount of acidic material employed in the preparation of the disperse system will be that amount sufficient to reduce the neutralization base number of the final disperse system to the desired level, generally to about 7 or less, preferably about 3 or less when referenced against a phenolphthalein indicator.

The following Examples 1–23 illustrate the preparation basic metal salts which are useful as component (A) in preparing the compositions of the invention. Unless otherwise indicated in the following examples and elsewhere in the specification and appended claims, "percentages" and "parts" refer to percent by weight and parts by weight, and temperatures are in degrees centigrade. Where temperatures exceed the boiling points of the components of the reaction mixture, reflux conditions are employed unless the reaction products are being heated to remove volatile components. The term "naphtha" as used in the following examples refers to petroleum distillates boiling in the range of about 90° to about 150° C.

EXAMPLE 1

A mixture of 3185 parts of methanol, 28.25 parts of calcium chloride and 226.5 parts of tap water is prepared in a glass-lined reactor equipped with a heating mantle, thermocouple, metal stirrer, gas inlet tube and condenser. The mixture is heated to 48° C. with stirring. Silo lime (644.5 parts, 94% calcium hydroxide) is added to the mixture to provide a slurry. The temperature of the mixture is reduced to 45° C., and 7075 parts of polypropylene (MW=337) substituted benzene sulfonic acid are added to the mixture over a period of one hour. The temperature of the mixture reaches 46° C. The mixture is stirred for one-half hour. SC Solvent 100 (6275 parts, a high-boiling alkylated aromatic solvent supplied by Ohio Solvents) is added to the mixture, and the mixture is stirred for 15 minutes. Three increments of 1772.75 parts of Silo lime are added to the mixture. Carbon dioxide at a rate of five standard cubic feet per hour is bubbled through the mixture after each increment. Total bowling with carbon dioxide is approximately 10.5 hours with the temperature of the mixture varying from 40° C. to 50° C. The mixture is stripped with nitrogen blowing at a rate of two standard cubic feet per hour while heating to reflux over a nine-hour period, the temperature increasing over said period from 47° C. to 160° C. The mixture is cooled to room temperature. The mixture is filtered through a Gyro Tester clarifier. The solids content is adjusted to 70% solids with SC Solvent 100.

EXAMPLE 2

A calcium mahogany sulfonate is prepared by double decomposition of a 60% oil solution of 750 parts of sodium mahogany sulfonate with the solution of 67 parts of calcium chloride and 63 parts of water. The reaction mass is heated for 4 hours at 90°–100° C. to affect the conversion of the sodium mahogany sulfonate to calcium mahogany sulfonate. Then 54 parts of 91% calcium hydroxide solution is added and the material is heated to 150° C. over a period of 5 hours. When the material has cooled to 40° C., 98 parts of methanol is added and 152 parts of carbon dioxide is introduced over a period of 20 hours at 42°–43° C. Water and alcohol are thebn removed by heating the mass to 150° C. The residue in the reaction vessel is diluted with 100 parts of mineral oil. The filtered oil solution of the desired carbonated calcium sulfonate overbased material shows the following analysis: sulfate ash content, 16.4%; a neutralization number, as measured against phenophthalein of 0.6 (acidic); and a metal ratio of 2.50.

EXAMPLE 3

A mixture comprising 1595 parts of the overbased material of Example 2 (1.54 equivalents based on sulfonic acid anion), 167 parts of the calcium phenate prepared as indicated below (0.19 equivalent), 616 parts of mineral oil, 157 parts of 91% calcium hydroxide (3.86 equivalents), 288 parts of methanol, 88 parts of isobutanol and 56 parts of mixed isomeric primary amyl alcohols (containing about 65% normal amyl, 3% isoamyl and 32% 2-methyl-1-butyl alcohols) is stirred vigorously at 40° C. and 25 parts of carbon dioxide is introduced over a period of 2 hours at 40°–50° C. Thereafter, three additional portions of calcium hydroxide, each amounting to 157 parts each are added and each such addition is followed by the introduction of carbon dioxide as previously illustrated. After the fourth calcium hydroxide addition and the carbonation step is completed, the reaction mass is carbonated for an additional hour at 43°–47° C. to reduce the neutralization number of the mass to 4.0 (basic). The substantially neutral, carbonated reaction mixture is then heated to 150° C. under a nitrogen atmosphere to remove alcohol and any by-product water. The residue in the reaction vessel is then filtered. The filtrate, an oil solution of the desired substantially neutral, carbonated calcium sulfonate overbased material of high metal ratio shows the following analysis: sulfate ash content 41.11%; neutralization number 0.9 (basic); and a metal ratio of 12.55.

The calcium phenate used above is prepared by adding 2550 parts of mineral oil, 960 parts (5 moles) of heptylphenol, and 50 parts of water into a reaction vessel and stirring at 25° C. The mixture is heated to 40° C. and 7 parts of calcium hydroxide and 231 parts (7 moles) of 91% commercial paraformaldehyde is added over a period of one hour. The contents are heated to 80° C. and 200 additional parts of calcium hydroxide (making a total of 207 parts or 5 moles) is added over a period of one hour at 80°–90° C. The contents are heated to 150° C. and maintained at that temperature for 12 hours while nitrogen is blown through the mixture to assist in the removal of water. If foaming is encountered, a few drops of polymerized dimethylsilicone foam inhibitor may be added to control the foaming. The reaction mass is then filtered. The filtrate, a 33.6% oil solution of the desired calcium phenate of heptaphenolformaldehyde condensation product is found to contain 7.56% sulfate ash.

EXAMPLE 4

To a mixture of 3245 grams (12.5 equivalents) of a mineral oil solution of barium petroleum sulfonate (sulfate ash of 7.6%), 32.5 parts of octylphenol, 197 parts of water, there is added 73 parts of barium oxide within a period of 30 minutes at 57°–84° C. The mixture is heated at 100° C. for 1 hour to remove substantially all water and blown with 75 parts of carbon dioxide at 133° C. to 170° C. within a period of 3 hours. A mixture of 1000 grams of the above carbonated intermediate product, 121.8 parts of octylphenol, and 234 parts of barium hydroxide is heated at 100° C. and then at 150° C. for 1 hour. The mixture is then blown with carbon dioxide at 150° C. for 1 hour at a rate of 3 cubic feet per hour. The carbonated product is filtered and the filtrate is found to have a sulfate ash content of 29.8% and a metal ratio of 9.3.

EXAMPLE 5

To a mixture of 3245 grams (12.5 equivalents) of barium petroleum sulfonate, 1460 grams (7.5 equivalents) of heptylphenol, and 2100 grams of water in 8045 grams of mineral oil there is added at 180° C., 7400 grams (96.5 equivalents) of barium oxide. The addition of barium oxide causes the temperature to rise to 143° C. which temperature is maintained until all the water has been distilled. The mixture is then blown with carbon dioxide until it is substantially neutral. The product is diluted with 5695 grams of mineral oil and filtered. The filtrate is found to have a barium sulfate ash content of 30.5% and a metal ratio of 8.1. Another inert liquid such as benzene, toluene, heptene, etc., can be substituted for all or part of the mineral oil.

EXAMPLE 6

(a) To a mixture of 1145 grams of a mineral oil solution of a 40% solution of barium mahogany sulfonates (1.0 equivalent) and 100 grams of methyl alcohol at 55° C., there is added 220 grams of barium oxide while the mixture is being blown with carbon dioxide at a rate of 2 to 3 cubic feet per hour. To this mixture there is added an additional 78 grams of methyl alcohol and then 460 grams of barium oxide while the mixture is blown with carbon dioxide. The carbonated product is heated to 150° C. for 1 hour and filtered. The filtrate is found to have a barium sulfate ash content of 53.8% and metal ratio of 8.9

(b) A carbonated basic metal salt is prepared in accordance with the procedure of (a) except that a total of 16 equivalents of barium oxide is used per equivalent of the barium mahogany sulfonate. The product possesses a metal ratio of 13.4.

EXAMPLE 7

A mixture of 520 parts (by weight) of a mineral oil, 480 parts of a sodium petroleum sulfonate (molecular weight of 480), and 84 parts of water is heated at 100° C. for 4 hours. The mixture is then heated with 86 parts of a 76% aqueous solution of calcium chloride and 72 parts of lime (90% purity) at 100° C. for 2 hours, dehydrated by heating to a water content of less than 0.5%, cooled to 50° C., mixed with 130 parts of methyl alcohol, and then blown with carbon dioxide at 50° C. until substantially neutral. The mixture is then heated to 150° C. to remove the methyl alcohol and water and the resulting oil solution of the basic calcium sulfonate filtered. The filtrate is found to have a calcium sulfate ash content of 16% and a metal ratio of 2.5.

A mixture of 1305 grams of the above carbonated calcium sulfonate, 930 grams of mineral oil, 220 grams of methyl alcohol, 72 grams of isobutyl alcohol, and 38 grams of primary amyl alcohol is prepared, heated to 35° C., and subjected to the following operating cycle 4 times: mixing with 143 grams of 90% calcium hydroxide and treating the mixture with carbon dioxide until it has a base number of 32–39. The resulting product is then heated to 155° C. during a period of 9 hours to remove the alcohols and filtered through a siliceous filter aid at this temperature. The filtrate has a calcium sulfate ash content of 39.5% and a metal ratio of 12.2.

EXAMPLE 8

A basic metal salt is prepared by the procedure described in Example 7 except that the slightly basic calcium sulfonate having a metal ratio of 2.5 is replaced with a mixture of that calcium sulfonate (280 parts by weight) and tall oil acid (970 parts by weight having an equivalent weight of 340) and that the total amount of calcium hydroxide used is 930 parts by weight. The resulting highly basic metal salt of the process has a calcium sulfate ash content of 48%, a metal ratio of 7.7, and an oil content of 31%.

EXAMPLE 9

A normal calcium mahogany sulfonate is prepared by metathesis of a 60% oil solution of sodium mahogany sulfonate (750 parts by weight) with a solution of 67 parts of calcium chloride and 63 parts of water. The reaction mass is heated for 4 hours at 90°–100° C. to effect the conversion of a sodium mahogany sulfonate to calcium mahogany sulfonate. Then 54 parts of lime is added and the whole is heated to 150° C. over a period of 5 hours. When the whole has cooled to 40° C., 98 parts of methanol is added and 152 parts of carbon dioxide is introduced over a period of 20 hours at 42°–43° C. Water and alcohol are then removed by heating the mass to 150° C. The residue in the reaction vessel is diluted with 100 parts of low viscosity mineral oil. The filtered oil solution of the desired carbonated calcium sulfonate overbased material shows the following analysis: sulfate ash content, 16.4%; neutralization number, 0.6 (acidic); and a metal ratio of 2.50. By adding barium or calcium oxide or hydroxide to this product with subsequent carbonation, the metal ratio can be increased to a ratio of 3.5 or greater as desired.

EXAMPLE 10

The procedure of Example 7 is repeated except that an equivalent amount of sodium hydroxide is used in lieu of the calcium oxide. The product is the corresponding sodium overbased material.

EXAMPLE 11

A mixture of 244 parts (0.87 equivalent) of oleic acid, 180 parts of primary isooctanol, and 400 parts of mineral oil is heated to 70° C. whereupon 172.6 parts (2.7 equivalents) of cadmium oxide is added. The mixture is heated for 3 hours at a temperature of 150°–160° C. while removing water. Barium hydroxide monohydrate (324 parts, 3.39 equivalents) is then added to the mixture over a period of 1 hour while continuing to remove water by means of a side-arm water trap. Carbon dioxide is blown through the mixture at a temperature of from 150°–160° C. until the mixture is slightly acidic to phenolphthalein. Upon completion of the carbonation, the mixture is stripped to a temperature of 150° C. at 35 mm. of mercury to remove substantially all the remaining water and alcohol. The residue is the desired overbased product containing both barium and cadmium metal.

EXAMPLE 12

A sulfoxide is prepared by treating polyisobutylene (average molecular weight 750) with 47.5% of its weight of $SOCl_2$ for 4.5 hours at 220° C. A mixture of 787 grams (1.0 equivalent) of this sulfoxide, 124 grams (0.6 equivalent) of diisobutylphenol, 550 grams of mineral oil, and 200 grams of water was warmed to 70° C. and treated with 360 grams (4.0 equivalents) of barium oxide. This mixture is heated at reflux temperature for 1 hour and treated at 150° C. with carbon dioxide until the mixture is substantially neutral and thereafter filtered to yield a clear, oil-soluble liquid having the following analysis: sulfate ash, 22.8%; neutralization number, 5.8 (basic); and metal ratio, 5.8.

EXAMPLE 13

To a mixture of 268 grams (1.0 equivalent) of oleyl alcohol, 675 grams of mineral oil, 124 grams (0.6 equivalent) of diisobutylphenol, and 146 grams of water, at 70° C. there is added 308 grams (4.0 equivalents) of barium oxide. This mixture is heated at reflux temperature for 1 hour, then at 150° C. while bubbling carbon dioxide therethrough until substantial neutrality of the mixture is achieved. The resulting reaction mass is filtered resulting in a clear, brown, oil-soluble filtrate having the following analysis: sulfate ash content, 29.8%; neutralization number 2.6 (basic); and metal ratio, 6.0.

EXAMPLE 14

To a mixture of 423 grams (1.0 equivalent) of sperm oil, 124 grams (0.6 equivalent) of heptylphenol, 500 grams of mineral oil, and 150 grams of water there are added at 70° C., 308 grams (4.0 equivalents) of barium oxide. This mixture is heated at reflux temperature for 1 hour, dried by heating at about 150° C. and thereafter carbonated by treatment with carbon dioxide at the same temperature until the reaction mass is slightly acidic. Filtration yields a clear, light brown, non-viscous overbased liquid material having the following analysis: sulfate ash content, 32.0%; neutralization number 0.5 (basic); metal ratio, 6.5.

EXAMPLE 15

A mixture of 6000 grams of a 30% solution of barium petroleum sulfonate (sulfate ash 7.6%), 348 grams of paratertiary butylphenol, and 2911 grams of water are heated to a temperature of 60° C. while slowly adding 1100 grams of barium oxide and raising the temperature to 94°-98° C. The temperature is held within this range for about 1 hour and then slowly raised over a period of 7.5 hours to 150° C. and held at this level for an additional hour assuring substantial removal of all water. The resulting overbased material is a brown liquid having the following analysis: sulfate ash content, 26.0%; metal ratio, 4.35.

This product is then treated with $SO_2$ until 327 grams of the mass combined with the overbased material. The product thus obtained has a neutralization number of zero. The $SO_2$-treated material is liquid and brown in color.

One-thousand grams of the $SO_2$-treated overbased material produced according to the preceding paragraph is mixed with 286 grams of water and heated to a temperature of about 60° C. Subsequently, 107.5 grams of barium oxide are added slowly and the temperature is maintained at 94°-98° C. for 1 hour. Then the total reaction mass is heated to 150° C. over a 1 1/16 hour period and held there for a period of 1 hour. The resulting overbased material is purified by filtration, the filtrate being the brown, liquid overbased material having the following analysis: sulfate ash content, 33.7%; basic number, 38.6; metal ratio, 6.3.

EXAMPLE 16

(a) A mixture of 1 equivalent of a nitrated polypropylene having a molecular weight of about 3000, 2 equivalents of cetylphenol, mineral oil, and 3 equivalents of barium hydroxide is heated at reflux temperature for 1 hour. The temperature is then raised to 150° C. and carbon dioxide is bubbled through the mixture at this temperature. The reaction product is filtered and the filtrate is the desired overbased material.

(b) A solvent-refined, acid-treated Pennsylvania petroleum lubricating oil is nitrated by treatment with 1.5 moles of 70% aqueous nitric acid at 54°-78° C. for 8 hours. After removal of volatile components of the product mixture by heating at 103° C. at a pressure of 15 mm. of mercury for 2 hours, a 787 grams portion (1.0 equivalent) of the nitrated product is treated with 2 grams (0.3 equivalent) of heptylphenol, 495 grams of mineral oil, 90 grams of water, and 378 grams (5 equivalents) of barium oxide. This mixture is heated at reflux temperature for an hour, then freed of water by distillation. The temperature is increased to 150° C. whereupon carbon dioxide is bubbled into the mixture until it is neutral. Filtration yields a clear filtrate with the following analysis: percent sulfate ash, 27.6; percent N, 0.5; and metal ratio, 3.1.

EXAMPLE 17

A partially acylated polyamine reactant is prepared as follows: a mixture (565 parts by weight) of an alkylene amine mixture consisting of triethylene tetramine and diethylene triamine in weight ratio of 3:1 is added at 20°-80° C. to a mixture of naphthenic acid having an acid number of 180 (1270 parts) and oleic acid (1110 parts). The total quantity of the two acids used is such as to provide 1 equivalent of acid for each two equivalents of the amine mixture used. The reaction is exothermic. The mixture is blown with nitrogen while it is being heated to 240° C. in 4.5 hours and thereafter heated at this temperature for 2 hours. Water is collected as the distillate.

To the above residue, ethylene oxide (140 parts) is added at 170°-180° C. within a period of 2 hours while nitrogen is bubbled through the reaction mixture. Nitrogen blowing is continued for an additional 15 minutes and the reaction mixture then is diluted with 940 parts of xylene to a solution containing 25% by weight of xylene. The resulting solution has a nitrogen content of 5.4% and a base number of 82 at a pH of 4, the latter being indicative of free amino groups.

A 789 gram portion of the above xylene solution (3 equivalents of nitrogen) is heated to 150° C. at a pressure of 2 millimeters of mercury to distill off xylene and is then mixed with 367 grams of heptylphenol (having a hydroxyl content of 8.3%; 1.8 equivalents). To this mixture there is added 345 grams (4.5 equivalents) of barium oxide in small increments at 90°-111° C. The mixture is heated at 90°-120° C. for 2.5 hours and blown with carbon dioxide for 1.75 hours. It is diluted with 130 grams of xylene and then heated at 150° C. for 3.5 hours. It is then diluted with 20% by weight of xylene and filtered. The filtrate has a barium sulfate ash content of 33.2%, a nitrogen content of 3.51% and a reflux base number of 134.

EXAMPLE 18

A mixture of 5846 parts (4.0 equivalents) of a neutral calcium sulfonate having a calcium sulfate ash content of 4.68% (66% mineral oil), 464 parts (2.4 equivalents) of heptylphenol, and 3.4 parts of water is heated to 80° C. whereupon 1480 parts (19.2 equivalents) of barium oxide is added over a period of 0.6 hour. The reaction is exothermic and the temperature of the reaction mixture reaches 100° C. The mixture is heated to 150° C. and carbonated at this temperature. During the carbonation, 24 parts of barium chloride were added to the mixture. Oil was removed from the reaction mixture during the carbonation procedure. Carbonation is continued at this temperature until the mixture has a base number (phenolphthalein) of 80. Octyl alcohol (164 parts) and a filter aid are added to the mixture and the mixture is filtered while hot. The filtrate is the desired overbased barium bright stock sulfonate having a barium sulfate ash content of 26.42, a metal ratio of 4.6 and a reflux base number of 104.

EXAMPLE 19

A barium overbased carboxylic acid is prepared by carbonating a mixture of 9.8 equivalents of barium hydroxide, 1 equivalent of heptylphenol, and 0.81 equivalent of a polyisobutene-substituted succinic anhydride wherein the polyisobutenyl portion thereof has an average molecular weight of 1000.

EXAMPLE 20

A mixture of 1000 parts by weight of a polyisobutene having a molecular weight of 1000 and 90 parts of phosphorus pentasulfide is prepared at room temperature, heated to 260° C. over 5 hours, and maintained at this temperature for an additional 5 hours. The reaction mass is then cooled to 106° C. and hydrolyzed by treatment with steam at this temperature for 5 hours. The hydrolyzed acid has a phosphorus content of 2.4%, a sulfur content of 2.8%. In a separate vessel, a mixture of oil and barium hydroxide is prepared by mixing 2200 parts of a minerl oil and 1150 parts of barium oxide at 88° C. and blowing the mixture with steam for 3 hours at 150° C. To this mixture there is added portionwise throughout a period of 3 hours, 1060 parts of the above hydrolyzed acid while maintaining the temperature at 145°–150° C., and then 360 parts of heptylphenol is added over a 1.5 hour period. The resulting mixture is blown with carbon dioxide at the rate of 100 parts per hour for 3 hours at 150°–157° C. The carbonated product is mixed with 850 parts of a mineral oil and dried by blowing it with nitrogen at a temperature of 150° C. The dry product is filtered and the filtrate is diluted with mineral oil to a solution having a barium sulfate ash content of 25%. The final solution has a phosphorus content of 0.48%, a neutralization number less than 5 (basic), a reflux base number of 109, and a metal ratio of 7.2.

EXAMPLE 21

A thiophosphorus acid is prepared as set forth in Example 20 above. A mixture of 890 grams of this acid (0.89 equivalent), 2945 grams of mineral oil, 445 grams of heptylphenol (2.32 equivalents), and 874 grams of lithium hydroxide monohydrate (20.8 equivalents) formed by adding the metal base to the mineral oil solution of the acid and the heptylphenol over a 1.5 hour period maintaining the temperature at 100°–110° C. and thereafter drying at 150° C. for 2 hours, carbon dioxide is bubbled therethrough at the rate of 4 cubic feet per hour until the reaction mixture was slightly acidic to phenolphthalein, about 3.5 hours, while maintaining the temperature within the range of 150°–160° C. The reaction mixture is then filtered twice through a diatomaceous earth filter. The filtrate is the desired lithium overbased thio-phosphorus acid material having a metal ratio of 6.3.

EXAMPLE 22

A mixture of alkylated benzene sulfonic acids and naphtha is prepared by adding 1000 grams of a mineral oil solution of the acid containing 18% by weight mineral oil (1.44 equivalents of acid) and 222 grams of naphtha. While stirring the mixture, 3 grams of calcium chloride dissolved in 90 grams of water and 53 grams of Mississippi lime (calcium hydroxide) are added. This mixture is heated to 97°–99° C. and held at this temperaure for 0.5 hour. Then 80 grams of Mississippi lime are added to the reaction mixture with stirring and nitrogen gas is bubbled therethrough to remove water, while heating to 150° C. over a 3 hour period. The reaction mixture is then cooled to 50° C. and 170 grams of methanol are added. The resulting mixture is blown with carbon dioxide at the rate of 2 cubic feet per hour until substantially neutral. The carbon dioxide blowing is discontinued and the water and methanol is stripped from the reaction mixture by heating and bubbling nitrogen gas therethrough. While heating to remove the water and methanol, the temperature rose to 146° C. over a 1.75 hour period. At this point the metal ratio of the overbased material was 2.5 and the product is a clear, dark brown viscous liquid. This material is permitted to cool to 50° C. and thereafter 1256 grams thereof is mixed with 574 grams of naphtha, 222 grams of methanol, 496 grams of Mississippi lime, and 111 grams of an equal molar mixture of isobutanol and amyl alcohol. The mixture is thoroughly stirred and carbon dioxide is blown therethrough at the rate of 2 cubic feet per hour for 0.5 hour. An additional 124 grams of Mississippi lime is added to the mixture with stirring and the $CO_2$ blowing continued. Two additional 124 grain increments of Mississippi lime are added to the reaction mixture while continuing the carbonation. Upon the addition of the last increment, carbon dioxide is bubbled through the mixture for an additional hour. Thereafter, the reaction mixture is gradually heated to about 146° C. over a 3.25 hour period while blowing with nitrogen to remove water and methanol from the mixture. Thereafter, the mixture is permitted to cool to room temperature and filtered producing 1895 grams of the desired overbased material having a metal ratio of 11.3. The material contains 6.8% mineral oil, 4.18% of the isobutanol-amyl alcohol and 30.1% naphtha.

EXAMPLE 23

A reaction mixture comprising 1800 grams of a calcium overbased petrosulfonic acid containing 21.7% by weight mineral oil, 36.14% by weight naphtha, 426 grams naphtha, 255 grams of methanol, and 127 grams of an equal molar amount of isobutanol and amyl alcohol are heated to 45° C. under reflux conditions and 148 grams of Mississippi lime (commercial calcium hydroxide) is added thereto. The reaction mass is then blown with carbon dioxide at the rate of 2 cubic feet per hour and thereafter 148 grams of additional Mississippi lime added. Carbonation is continued for another hour at the same rate. Two additional 147 gram increments of Mississippi lime are added to the reaction mixture, each increment followed by about a 1 hour carbonation process. Thereafter, the reaction mass is heated to a temperature of 138° C. while bubbling nitrogen therethrough to remove water and methanol. After filtration, 2220 grams of a solution of the barium overbased petrosulfonic acid is obtained having a metal ratio of 12.2 and containing 12.5% by weight mineral oil, 34.15% by weight naphtha, and 4.03% by weight of the isobutanol amyl alcohol mixture.

The above Examples 1–23 illustrate various means for preparing overbased materials suitable for use in the compositions of the invention or for conversion to the non-Newtonian colloidal disperse systems utilized in the present invention. Obviously, it is within the skill of the art to vary these examples to produce any desired overbased material. Thus, other acidic materials such as mentioned hereinbefore can be substituted for the $CO_2$, $SO_2$, and acetic acid used in the above examples. Similarly, other metal bases can be employed in lieu of the metal base used in any given example, and mixtures of bases and/or mixtures of materials which can be overbased can be utilized. Similarly, the amount of mineral oil or other non-polar, inert, organic liquid used as the overbasing medium can be varied widely both during overbasing and in the overbased product.

The following Examples 24–39 illustrate the conversion of the Newtonian overbased materials (i.e., component (A) into non-Newtonian colloidal disperse systems (i.e., component (B)) by homogenization with conversion agents.

EXAMPLE 24

To 733 grams of the overbased material of Example 6(a) there is added 179 grams of acetic acid and 275 grams of a mineral oil (having a viscosity of 2000 SUS at 1000° F.) at 90° C. in 1.5 hours with vigorous agitation. The mixture is then homogenized at 150° C. for 2 hours and the resulting material is the desired colloidal disperse system.

EXAMPLE 25

Into a glass-lined reactor equipped with a heating mantle, thermocouple, gas inlet tube, condenser and metal stirrer, there is added 15,000 parts of the product of Example 1, and the product is heated to 40° C. with stirring. Carbon dioxide is bubbled through the mixture at a rate of one cubic foot per hour for 3.75 hours, the temperature of the mixture varying from 38° C. to 46° C. during the carbon dioxide blowing. 847.8 parts of isopropyl alcohol, 847.8 parts of methanol and 1304 parts of distilled water are added to the mixture over a five-minute period. The mixture exotherms to 45° C., and is then heated to 67° C. 2500 parts of SC Solvent 100 are added to the mixture. The mixture is heated to 78° C. and maintained at said temperature for 0.5 hour. The mixture is stripped by bubbling nitrogen at a rate of two standard cubic feet per hour through the mixture over a period of 5.5 hours, the temperature of the mixture increasing from 77° C. to 155° C. during stripping. The mixture is cooled with cooling water, and 16,700 parts of a gelled product having a solids content of 62.5% by weight are obtained.

EXAMPLE 26

Twelve-hundred parts of the product of Example 25 are placed in a resin reactor equipped with a heating mantle, metal stirrer, teflon bearing, gas inlet tube, thermocouple, trap and condenser. Polypropylene (MW=337) substituted benzene sulfonic acid (225.5 parts) is added to the mixture over a 10-minute period, and the mixture exotherms to 34° C. The temperature of the mixture is maintained at 34° C. for 20 minutes. Water is stripped from the mixture by bubbling nitrogen at a rate of two standard cubic feet per hour through the mixture. The trap is filled with SC Solvent 100 to prevent solvent loss. The temperature increases to 162° C. over a two-hour period during stripping. The temperature is then maintained at 162° C. for 0.5 hour. 7.5 cubic centimeters of water are collected. The mixture is cooled to room temperature, and 1413 parts of a low oil overbased sulfonate gel with a zero base number are obtained.

EXAMPLE 27

A mixture of 1000 parts of the product of Example 3, 303 parts of mineral oil, 80 parts of methanol, 40 parts of mixed primary amyl alcohols (containing about 65% by weight of normal amyl alcohol, 3% by weight of isoamyl alcohol, and 32% by weight of 2-methyl-1-butyl alcohol) and 80 parts of water are introduced into a reaction vessel and heated to 70° C. and maintained at that temperature for 4.2 hours. The overbased material is converted to a gelatinous mass. Stirring and heating of this gelatinous mass at 150° C. is continued for a period of about 2 hours to remove substantially all the alcohols and water. The residue is a dark green gel.

EXAMPLE 28

A solution of 1303 parts of the gel-like colloidal disperse system of Example 27 and 563 parts of mineral oil are dissolved in 1303 parts of toluene by continuous agitation of these two comonents for about 3 hours. Added to this mixture is 40 parts of water and 40 parts of methanol followed by the slow addition of 471 parts of 91% calcium hydroxide with continuous stirring. An exothermic reaction takes place raising the temperature to 32° C. The entire reaction mass is then heated to about 60° C. over a 0.25 hour period. 288 parts of carbon dioxide is then charged over a 5 hour period while maintaining the temperature at 60°–70° C. At the conclusion of the carbonation, the mass is heated to about 150° C. over a 0.75 hour period to remove water, methanol, and toluene. The resulting product, a clear, light brown colloidal disperse system in the form of a gel has the following analysis: sulfate ash content, 46.8%; a neutralization number, as measured against phenolphthalein of less than 1.0 (basic); and a metal ratio of 36.0. In the above-described procedure, additional metal containing particles are incorporated into the colloidal disperse system of Example 27 and its base neutralization number decreased to give a non-Newtonian colloidal disperse system useful in the invention of this application.

EXAMPLE 29

A mixture of 960 grams of the overbased material of Example 6(b), 256 grams of acetic acid, and 300 grams of a mineral oil (having a viscosity of 2000 SUS at 100° C.) is homogenized by vigorous stirring at 150° C. for 2 hours. The resulting product is a non-Newtonian colloidal disperse system of the type contemplated for use by the present invention.

The overbased material of this example can be converted without the addition of additional mineral oil or if another inert organic liquid is substituted for the mineral oil.

EXAMPLE 30

A mixture of 150 parts of the overbased material of Example 7, 15 parts of methyl alcohol, 10.5 parts of amyl alcohol, and 45 parts of water is heated under reflux conditions at 71°–74° C. for 13 hours whereupon the mixture gels. The gel is heated for 6 hours at 144° C., diluted with 126 parts of the mineral oil of the type used in Example 43 above, the diluted mixture heated to 144° C. for an additional 4.5 hours. The resulting thickened product is a colloidal disperse system. Again, it is not necessary that the material be diluted with mineral oil in order to be useful. The gel itself which results from the initial homogenization of the overbased material and the lower alkanol mixture is a particularly useful colloidal disperse system for incorporating into resinous compositions.

EXAMPLE 31

A mixture of 1000 grams of the product of Example 2, 80 grams of methanol, 40 grams of mixed primary amyl alcohols (containing about 65% by weight of normal amyl alcohol, 3% by weight of isoamyl alcohol, and 32% by weight of 2-methyl-1-butyl alcohol) and 80 grams of water are introduced into a reaction vessel and heated to 70° C. and maintained at that temperature for 4.2 hours. The overbased material is converted to a gelatinous mass, the latter is stirred and heated at 150° C. for a period of about 2 hours to remove substantially all the alcohols and water. The residue is a dark green gel, which is a particularly useful colloidal disperse system.

EXAMPLE 32

To 600 parts by weight of the overbased material of Example 7, there is added 300 parts of dioctylphthalate, 48 parts of methanol, 36 parts of isopropyl alcohol, and 36 parts of water. The mixture is heated to 70°–77° C. and maintained at this temperature for 4 hours during which the mixture becomes more viscous. The viscous solution is then blown with carbon dioxide for 1 hour until substantially neutral to phenolphthalein. The alcohols and water are removed by heating to approximately 150° C. The residue is the desired colloidal disperse system.

EXAMPLE 33

To 800 parts of the overbased material of Example 7, there is added 300 parts of kerosene, 120 parts of an alcohol: water mixture comprising 64 parts of methanol, 32 parts of water and 32 parts of the primary amyl alcohol mixture of Example 30. the mixture is heated to 75° C. and maintained at this temperature for 2 hours during which time the viscosity of the mixture increases. The water and alcohols are removed by heating the mixture to about 150° C. while blowing with nitrogen for 1 hour. The residue is the desired colloidal disperse system having the consistency of a gel.

EXAMPLE 34

A mixture of 340 parts of the product of Example 7, 68 parts of an alcohol:water solution consisting of 27.2 parts of methanol, 20.4 parts of isopropyl alcohol and 20.4 parts of water, and 170 parts of heptane is heated to 65° C. During this period, the viscosity of the mixture increases from an initial value of 6250 to 54,000.

The thickened colloidal disperse system is further neutralized by blowing the carbon dioxide at the rate of 5 pounds per hour for 1 hour. The resulting mass is found to have a neutralization number of 0.87 (acid to phenolphthalein indicator).

EXAMPLE 35

The procedure of Example 34 is repeated except that the calcium overbased material of Example 7 is replaced by an equivalent amount of the cadmium and barium overbased material of Example 11. Xylene (200 parts) is used in lieu of the heptane and the further carbonation step is omitted.

EXAMPLE 36

A mixture of 500 parts of the overbased material of Example 7, 312 parts of kerosene, 40 parts of methylethyl ketone, 20 parts of isopropyl alcohol, and 50 parts of water is prepared and heated to 75° C. The mixture is maintained at a temperature of 70°-75° C. for 5 hours and then heated to 150° C. to remove the volatile components. The mixture is thereafter blown with ammonia for 30 minutes to remove most of the final traces of volatile materials and thereafter permitted to cool to room temperature. The residue is a brownish-tan colloidal disperse system in the form of a gel.

EXAMPLE 37

The overbased material of Example 7 is isolated as a dry powder by precipitation out of a benzene solution through the addition thereto of acetone. The precipitate is washed with acetone and dried.

A mixture of 45 parts of a toluene solution of the above-powder (364 parts of toluene added to 500 parts of the powder to produce a solution having a sulfate ash content of 43%), 36 parts of methanol, 27 parts of water, and 18 parts of mixed isomeric primary amyl alcohols (described in Example 47) is heated to a temperature within the range of 70°-75° C. The mixture is maintained at this temperature for 2.5 hours and then heated to remove the alkanols. The resulting material is a colloidal disperse system substantially free from any mineral oil. If desired, the toluene present in the colloidal disperse system as the disperse medium can be removed by first diluting the disperse system with mineral oil and thereafter heating the diluted mixture to a temperature of about 160° C. whereupon the toluene is vaporized.

EXAMPLE 38

Calcium overbased material similar to that prepared in Example 7 is made by substituting xylene for the mineral oil used therein. The resulting overbased material has a xylene content of about 25% and a sulfate ash content of 39.3%. This overbased material is converted to a colloidal disperse system by homogenizing 100 parts of the overbased material with 8 parts of methanol, 4 parts of the amyl alcohol mixture of Example 31, and 6 parts of water. The reaction mass is mixed for 6 hours while maintaining the temperature at 75°-78° C. Thereafter, the disperse system is heated to remove the alkanols and water. If desired, the gel can be diluted by the addition of mineral oil, toluene, xylene, or any other suitable disperse medium.

EXAMPLE 39

A mixture of 1000 parts of the overbased material of Example 3 and 388.4 parts of mineral oil is heated to 55°-60° C. and blown with carbon dioxide until the base number is about one. 56.5 parts methanol and 43.5 parts water are added and the whole is mixed at 75°-80° C. under reflux until the viscosity increases to a maximum. The maximum viscosity can be determined by visual inspection. 472.5 parts of 97.3% calcium hydroxide and 675.4 parts of mineral oil are added and the whole is blown with carbon dioxide at a temperature of 75°-80° C. until the whole is substantially neutral. Alcohol and water are removed by blowing the whole with nitrogen at 150° C. The resulting product has a calcium content of 13.75% and a metal ratio of 36.

(C): Hydrogenated Block Copolymers

The compositions of the present invention also include at least one hydrogenated block copolymer of a vinyl aromatic monomer and an aliphatic conjugated diene. The hydrogenated block copolymers, may be either normal block copolymers, that is, true block copolymers or random block copolymers.

Although the vinyl monomer from which the copolymer is derived may be a vinyl di- or polyaromatic compound such as vinyl naphthalene, it is preferably a monovinyl monoaromatic compound such as a styrene compound. The true or normal block copolymers are generally made from conjugated dienes having from 4 to 10 carbon atoms and preferably from 4 to 6 carbon atoms and vinyl-substituted aromatics having from 8 to 12 carbon atoms and preferably 8 or 9 carbon atoms. Specific examples of vinyl aromatic monomers include styrene, alpha-methylstyrene, ortho-methylstyrene, meta-methylstyrene, para-methylstyrene and paratertiary-butylstyrene. Styrene being preferred. Examples of such conjugated dienes include 1,3-pentadiene, 2,3-dimethyl-1,3-butadiene, chloroprene, isoprene and 1,3-butadiene. Isoprene and 1,3-butadiene are particularly preferred. Mixtures of such conjugated dienes are useful.

The normal block copolymers have a total of from 2 to about 5, and preferably 2 or 3, polymer blocks of the vinyl aromatic monomer and the conjugated diene with at least one polymer block of said vinyl aromatic monomer and at least one polymer block of said conjugated diene being present. The conjugated diene block is hydrogenated as more fully set forth hereinbelow. The normal block copolymers can be linear block copolymers wherein a substantially long sequence of one monomeric unit (Block I) is linked with another substantially long sequence of a second (Block II), third (Block III), fourth (Block IV), or fifth (Block V) monomeric unit. For example, if A is a styrene monomer unit and D is a conjugated diene monomer unit, a tri-block copolymer of these monomeric units can be represented by the formula:

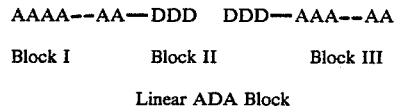

Linear ADA Block

These copolymers can also be radial block copolymers wherein the polymer blocks are linked radially as represented by the formula:

Radial AD Block

The number of repeat units involved in each polymer block usually exceeds about 500, but it can be less than about 500. The sequence length in one block should be long enough so that the block copolymer exhibits the inherent homopolymeric physical properties such as glass transition temperature and polymer melt temperature.

The vinyl aromatic monomer content of these copolymers, that is the total amount of vinyl aromatic blocks in the normal block copolymer, is in the range of from about 20 percent to about 70 percent by weight and preferably from about 40 percent to about 60 percent by weight. Thus, the aliphatic conjugated diene content, that is the total diene block content, of these copolymers is in the range of from about 30 percent to about 80 percent by weight and preferably from about 40 percent to about 60 percent by weight.

The normal block copolymers can be prepared by conventional methods well known in the art. Such copolymers usually are prepared by anionic polymerization using, for example, an alkali metal hydrocarbon (e.g., sec-butyllithium) as a polymerization catalyst. Details of the procedures for preparing the block copolymers are found in, for example, U.S. Pat. Nos. 3,763,044 and 3,772,196.

Polymerization is usually conducted in solution in an inert solvent such as cyclohexane or alkanes such as butanes or pentanes and mixtures of the same. The first monomer to be polymerized (which may be either a monoalkenylarene, butadiene or isoprene) is injected into the system and contacted with the polymerization initiator which is added in an amount calculated to provide the predetermined average molecular weight. Subsequent to obtaining the desired molecular weight and depletion of the monomer, the second monomer is then injected into the living polymer system and block polymerization occurs, resulting in the formulation of the living block copolymer which is then killed, e.g., by the addition of methanol or water.

Examples of suitable, commercially available, hydrogenated normal block copolymers as set forth above include Shellvis-40, and Shellvis-50, manufactured by Shell Chemicals.

The random block copolymer which can be utilized separately, in combination with the normal block polymers set forth above, or not at all, is generally defined as a block copolymer having one or more block polymer portions therein. More specifically, the random block copolymers can be defined as an indeterminate number of A and D blocks of indeterminate lengths. These random copolymers are generally made from conjugated dienes of the type noted above, and butadiene or isoprene is preferred. The remaining monomer utilized to make the random block copolymer comprises vinyl aromatic monomers of the type set forth hereinabove. A suitable type of aromatic monomer is styrene. The random block copolymer can be made by simultaneously feeding a mixture of monomers to a polymerization system rather than feeding the monomers in a sequential manner. The amount of the various blocks by weight are the same as set forth above, that is from about 20 to about 70 percent by weight of vinyl substituted aromatic blocks with 40 to 60 percent by weight of such blocks being preferred. Accordingly, the amount of the diene blocks is the difference. The number average molecular weight and the weight average molecular weight of the random block copolymers are the same as set forth above and accordingly is hereby fully incorporated by reference. The random block copolymers contain significant blocks of a vinyl aromatic monomer repeating unit and/or significant blocks of a conjugated diene repeating unit therein and/or blocks of random or random tapered conjugated diene/vinyl substituted aromatic. These copolymers also can be represented as by A'-B'-A'-B' wherein A' is a block of vinyl substituted aromatic compound, B' is a block of conjugated diene, and the length of A' and B' blocks vary widely and, are substantially shorter than the A and B blocks of a normal block polymer. The amount of the aromatic A' block content of the random block copolymer preferably should be in the range of about 15 to about 45, more preferably 25 to about 40 weight percent.

Examples of such commercially available random block copolymers include the various Glissoviscal block copolymers manufactured by BASF. A previous available random block copolymer was Phil-Ad viscosity improver, manufactured by Phillips Petroleum.

Regardless of whether a true or normal block copolymer or a random block copolymer, or combinations of both are utilized, they are hydrogenated before use in this invention so as to remove virtually all of their olefinic double bonds. Techniques for accomplishing this hydrogenation are well known to those of skill in the art and need not be described in detail at this point. The procedure is described in U.S. Pat. Nos. 3,113,986 and 3,205,278. Briefly, hydrogenation is accomplished by contacting the copolymers with hydrogen at superatmospheric pressures in the presence of a metal catalyst such as an organo-transition metal catalyst and trialkyl aluminum compound. Alternatively nickel catalysts can be used as described in U.S. Pat. No. 2,864,809.

In general, it is preferred that these block copolymers, for reasons of oxidative stability, contain no more than about 5% and preferably no more than about 0.5% residual olefinic unsaturation on the basis of the total number of carbon-to-carbon covalent linkages within the average molecule. Such unsaturation can be measured by a number of means well known to those of skill in the art, such as infrared, NMR, etc. Most preferably, these copolymers contain no discernible unsaturation, as determined by the aforementioned analytical techniques.

The A block copolymers typically have number average molecular weights in the range of about 10,000 to about 500,000, preferably about 30,000 to about 200,000. The weight average molecular weight for these copolymers is generally in the range of about 50,000 to about 500,000, preferably about 30,000 to about 300,000.

In one embodiment of the present invention, compositions are prepared which comprise a mixture of the above-described non-Newtonian colloidal disperse systems (component (B)) and the hydrogenated block copolymers B. The hydrogenated block copolymers are not only compatible with the disperse systems (B), the hydrogenated block copolymers improve the rheology characteristics of the non-Newtonian disperse system. Moreover, non-Newtonian disperse systems modified in accordance with the present invention by the incorporation of the hydrogenated block copolymers exhibit improved corrosion inhibition, ultraviolet stabilization, flexibility and humidity resistance.

In another embodiment of the present invention, coating compositions for metal surfaces can be prepared, and these are mixtures of (A) at least one neutral or basic metal salt of an acidic organic compound or mixtures of neutral and basic metal salts and/or (B) at least one non-Newtonian colloidal disperse system as described above, and (C) at least one of the above-described hydrogenated block copolymers. When applied to metal surfaces, the coating compositions of the present invention impart improved corrosion resistance to the metal surfaces, and the coating compositions exhibit improved flexibility and non-drip characteristics. The amounts of the various components incorporated into the compositions of the present invention may vary over a wide range although the compositions generally will contain from about 1 to about 50% by weight of the hydrogenated block copolymer B, and from about 50% to about 99% by weight of component (A) and/or component (B). In a more preferred embodiment, the compositions of the present invention will contain from about 1 to about 20% by weight of the hydrogenated block copolymer B.

The compositions of the present invention can be prepared using standard mixing techniques. The specific means by which the hydrogenated block copolymer B is incorporated into the components (B) and/or (A) is not a critical feature of this invention. For example, since component (A) is a liquid and the colloidal disperse system (B) is a liquid or semi-liquid (i.e., gel), they can be mixed directly with component (C) and any other ingredients of the composition. In another embodiment component (C) is dissolved in an organic diluent, and the solution then is mixed with component (B). The disperse systems can be mixed with the other ingredients in the same manner as any other thixotropic agent or additive. In some instances heating of the components facilitates preparation of the mixture.

In addition to the above components, the compositions of the present invention also may contain (d) at least one substantially inert, normally liquid organic diluent. The amount of diluent may range from about 0.01 to about 98% by weight. Generally, when the compositions contained a diluent, the diluent will be present in amounts of from about 35% up to about 98% by weight. The diluents which may be utilized in the compositions of the present invention may be any of the organic liquids used as the solvents for the overbasing reaction or any of the liquids useful as the dispersed medium (B-2) of the colloidal disperse systems described above. In one embodiment useful in coating applications, the compositions of the invention can include low boiling solvents which can evaporate at low temperatures. Suitable solvents include hydrocarbon and halohydrocarbon solvents such as 1,1,1-trichloroethane, benzene, toluene, mineral spirits and turpentine. When a high-solids composition is desired, the level of the solvent is minimized.

In addition, the substantially inert, normally liquid organic diluent employed in the compositions of the present invention can be selected from a wide variety of natural and synthetic lubricating oils and mixtures thereof. Natural oils include liquid petroleum oils and solvent-treated or acid-treated mineral lubricating oils of the paraffinic naphthenic or mixed paraffinic-naphthenic types. Synthetic lubricating oils include aliphatic hydrocarbon oils such as polymerized and interpolymerized olefins (e.g., polybutylenes, polypropylenes, propylene-isobutylene copolymers, etc.); poly(1-hexenes), poly(1-octenes), poly(1-decenes), etc., and mixtures thereof.

Unrefined, refined and rerefined oils, either natural or synthetic (as well as mixtures of two or more of any of these) of the type disclosed hereinabove can be used in the concentrates of the present invention. Unrefined oils are those obtained directly from a natural or synthetic source without further purification treatment. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

The following examples illustrate the compositions of the present invention.

EXAMPLE A

A mixture of 92.5 parts of the product of Example 27 (50% solids), 3.75 parts of Shellvis 40 and 3.75 parts of Stoddard solvent is prepared by heating the mixture to a temperature of about 135°–138° C. over a period of two hours. Mixing is continued for an additional two hours to assure that the copolymer has completely dissolved. The resulting mixture is the desired product containing about 50% solids.

EXAMPLE B

The procedure of Example A is repeated except that the Shellvis 40 is replaced by an equivalent weight amount of Shellvis 50.

EXAMPLE C

A mixture of 50 parts of the product of Example 3 and 5.0 parts of Shellvis 40 is prepared by mixing at a temperature of about 50° C.

EXAMPLE D

A mixture of 50 parts of the product of Example 2, and 4 parts of Shellvis 50 is prepared as in Example C.

EXAMPLE E

The procedure of Example A is repeated except that 90 parts of the product of Example 27 is mixed with 5 parts of Shellvis 40 and 5 parts of Stoddard solvent.

The compositions of the invention comprising a mixture of components (B) and (C) as described above are useful in a variety of applications. The compositions are useful as protective films (e.g., automobile rust-proofing) and as intermediates in formulating protective coatings containing other resins, waxes and/or asphalts. The compositions provide a high degree of corrosion resistance and non-drip characteristics as dry films and when spray applied.

The compositions of the invention exhibit excellent rheology characteristics which are especially apparent when diluted to progressively reduced solid contents. The tendency of the disperse system (B) to thin out on dilution is significantly reduced by the incorporation of component (C).

When used as coating compositions, the compositions of the invention can be applied to various surfaces, particularly metals using conventional coating techniques such as, for example, spraying including airless spraying, brushing, dipping, roller coating, etc. These coating compositions are particularly useful as metal coatings. The compositions of the invention provide heat-stable, sag-resistant coatings with good gloss, ultraviolet stability and corrosion resistance.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A composition comprising a mixture of
   (B) at least one non-Newtonian colloidal disperse system comprising
      (B-1) solid metal-containing colloidal particles,
      (B-2) a liquid dispersing medium, and
      (B-3) at least one organic compound which is soluble in said dispersing medium, the molecules of said organic compound being characterized by a hydrophobic portion and at least one polar substituent; and
   (C) at least one hydrogenated block copolymer of a vinyl aromatic monomer and an aliphatic conjugated diene.

2. The composition of claim 1 comprising from about 50% to about 99% by weight of (B) and from about 1% to about 50% by weight of (C).

3. The composition of claim 1 wherein the solid metal-containing colloidal particles (B-1) comprise solid metal salts.

4. The composition of claim 1 wherein at least about 10% of the solid metal-containing colloidal particles (B-1) are characterized by having been formed in situ.

5. The composition of claim 1 wherein the solid metal-containing particles (B-1) are further characterized by having a unit particle size of from about 20 A to about 5000 A.

6. The composition of claim 1 wherein the solid metal-containing particles (B-1) are selected from alkali and alkaline earth metal salts.

7. The composition of claim 1 wherein (B-3) comprises an alkali or alkaline earth metal salt of an organic acid.

8. The composition of claim 7 wherein said organic acid is a sulfonic acid or a carboxylic acid.

9. The composition of claim 8 wherein said salt is an alkaline earth metal salt.

10. The composition of claim 1 wherein said solid metal-containing particles (B-1) comprise alkaline earth metal salts.

11. The composition of claim 1 wherein said solid metal-containing colloidal particles (B-1) comprise calcium carbonate.

12. The composition of claim 1 wherein (B-3) is represented by the formula

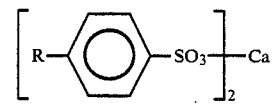

wherein R is a hydrocarbyl group of about 12 to about 30 carbon atoms.

13. The composition of claim 1 wherein said disperse system (A) comprises
   (A-1) solid calcium carbonate colloidal particles having a unit particle size in the range of about 50 A to about 4000 A,
   (A-2) an organic solvent, and
   (A-3) a third component represented by the formula

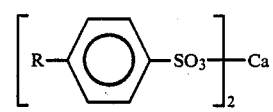

wherein R is a hydrocarbyl group having an average of about 12 to about 30 carbon atoms.

14. The composition of claim 1 wherein the molar ratio of (B-1) to (B-3) ranges from about 40:1 to about 2:1.

15. The composition of claim 1 wherein said system (B) is characterized by a neutralization base number of about 7 or less.

16. The composition of claim 1 wherein (C) comprises from about 2 to about 5 polymer blocks with at least one polymer block of said vinyl aromatic monomer and at least one polymer block of said aliphatic conjugated diene.

17. The composition of claim 16 wherein the vinyl aromatic monomer content in said copolymer is in the range of from about 20% to about 70% by weight, and the diene content is in the range of from about 30% to about 80% by weight.

18. The composition of claim 16 wherein the number average molecular weight of said copolymer (C) is in the range of from about 10,000 to about 500,000.

19. The composition of claim 16 wherein component (C) has 2 or 3 polymer blocks.

20. The composition of claim 1 wherein component (C) is a linear block copolymer.

21. The composition of claim 1 wherein component (C) is a radial block copolymer.

22. The composition of claim 1 wherein said vinyl aromatic compound is a styrene.

23. The composition of claim 1 wherein said conjugated diene is isoprene.

24. The composition of claim 1 wherein said conjugated diene is 1,3-butadiene.

25. The composition of claim 1 wherein the number average molecular weight for said copolymer (C) is in the range of about 30,000 to about 200,000.

26. The composition of claim 1 wherein the content of said vinyl aromatic monomer in said copolymer (C) is in the range of about 40% to about 60% by weight, and the content of said diene in said copolymer is in the range of about 40% to about 60% by weight.

27. The composition of claim 1 also containing
(D) at least one substantially inert, normally liquid organic diluent.

28. The composition of claim 27 containing from about 35% to about 98% by weight of the diluent (D).

29. A composition comprising a mixture of
(B) a non-Newtonian colloidal disperse system comprising
    (B-1) solid metal-containing colloidal particles predispersed in
    (B-2) a liquid dispersing medium, and
    (B-3) at least one organic compound which is soluble in said dispersing medium, the molecules of said organic compound being characterized by a hydrophobic portion and at least one polar substituent, and
(C) at least one hydrogenated block copolymer of a styrene and an aliphatic conjugated diene, said copolymer having from 2 to about 5 polymer blocks with at least one polymer block of said styrene and at least one polymer block of said hydrogenated aliphatic conjugated diene, the content of said styrene in said copolymer being in the range of from about 20% to about 70% by weight and the content of said diene being in the range of from about 30% to about 80% by weight, the number average molecular weight of said copolymer being in the range of about 10,000 to about 500,000.

30. The composition of claim 29 also containing
(D) a substantially inert, normally liquid organic diluent.

31. The composition of claim 29 containing from about 1% to about 20% by weight of (C).

32. The composition of claim 29 wherein said solid metal-containing colloidal particles (B-1) comprise solid metal salts.

33. The composition of claim 29 wherein at least about 10% of the solid metal-containing colloidal particles (B-1) are characterized by having been formed in situ.

34. The composition of claim 29 wherein the solid metal-containing particles (B-1) are further characterized by having a unit particle size of from about 20 A to about 5000 A.

35. The composition of claim 29 wherein the solid metal-containing particles (B-1) are selected from alkali and alkaline earth metal salts.

36. The composition of claim 29 wherein said solid metal-containing particles (B-1) comprise alkaline earth metal salts.

37. The composition of claim 29 wherein said solid metal-containing colloidal particles (B-1) comprise calcium carbonate.

38. The composition of claim 29 wherein (B-3) comprises an alkali or alkaline earth metal salt of an organic acid.

39. The composition of claim 38 wherein said organic acid is a sulfonic acid or a carboxylic acid.

40. The composition of claim 39 wherein said salt is an alkaline earth metal salt.

41. The composition of claim 29 wherein (B-3) is represented by the formula

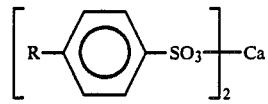

wherein R is a hydrocarbyl group of about 12 to about 30 carbon atoms.

42. The composition of claim 29 therein said disperse system (B) comprises
(B-1) solid calcium carbonate colloidal particles having a unit particle size in the range of about 50 A to about 4000 A,
(B-2) an aromatic solvent; and
(B-3) a third component represented by the formula

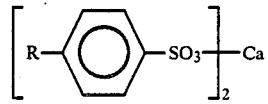

wherein R is a hydrocarbyl group having an average of about 12 to about 30 carbon atoms.

43. The composition of claim 42 wherein the molar ratio of (B-1) to (B-3) ranges from about 40:1 to about 2:1.

44. The composition of claim 29 wherein said system (B) is characterized by a neutralization base number of about 7 or less.

45. The composition of claim 29 wherein component (C) has 2 or 3 polymer blocks.

46. The composition of claim 29 wherein component (C) is a linear block copolymer.

47. The composition of claim 29 wherein component (C) is a radial block copolymer.

48. The composition of claim 29 wherein said styrene is styrene.

49. The composition of claim 29 wherein said conjugated diene is isoprene.

50. The composition of claim 29 wherein said conjugated diene is 1,3-butadiene.

51. The composition of claim 29 wherein the styrene content in said copolymer is in the range of about 40% to about 60% by weight, and the diene content in said copolymer is in the range of from about 40% to about 60% by weight.

52. A method of protecting metal from corrosion which comprises applying to said metal, a composition comprising a mixture of
(A) at least one neutral or basic metal salt of an acidic organic compound or mixtures of said neutral and-/or basic metal salts, or
(B) at least one non-Newtonian colloidal disperse system comprising
    (B-1) solid metal-containing colloidal particles,
    (B-2) a liquid dispersing medium, and
    (B-3) at least one organic compound which is soluble in said dispersing medium, the molecules of said organic compound being characterized by a hydrophobic portion and at least one polar substituent; and
(C) at least one hydrogenated block copolymer of a vinyl aromatic monomer and an aliphatic conjugated diene.

53. The method of claim 52 wherein (A) is an overbased salt having a metal ratio of at least about 2.0.

54. The method of claim 52 wherein the metal salt (A) is selected from alkali and alkaline earth metal salts.

55. The method of claim 52 wherein the metal salt is an alkali or alkaline earth metal salt of at least one sulfonic acid, carboxylic acid, organic phosphorus acid or phenol.

56. The method of claim 55 wherein the salt is an alkaline earth metal salt.

57. The method of claim 52 wherein the metal salt is an alkaline earth metal salt of an organic sulfonic acid.

58. The method of claim 52 wherein the mixture also contains
(D) at least one substantially inert, normally liquid organic diluent.

59. The method of claim 58 wherein the mixture contains from about 35% to about 98% by weight of the diluent (D).

60. The method of claim 52 wherein the mixture contains
(B) at least one non-Newtonian colloidal disperse system comprising
(B-1) solid metal-containing colloidal particles,
(B-2) a liquid dispersing medium, and
(B-3) at least one organic compound which is soluble in said dispersing medium, the molecules of said organic compound being characterized by a hydrophobic portion and at least one polar substituent, and
(C) at least one hydrogenated block copolymer of a vinyl aromatic monomer and an aliphatic conjugated diene.

61. The method of claim 60 wherein the mixture comprises from about 50% to about 99% by weight of (B) and from about 1% to about 50% by weight of (C).

62. The method of claim 60 wherein the solid metal-containing colloidal particles (B-1) comprise solid metal salts.

63. The method of claim 60 wherein at least about 10% of the solid metal-containing colloidal particles (B-1) are characterized by having been formed in situ.

64. The method of claim 60 wherein the solid metal-containing particles (B-1) are further charactrized by having a unit particle size of from about 20 A to about 5000 A.

65. The method of claim 60 wherein the solid metal-containing particles (B-1) are selected from alkali and alkaline earth metal salts.

66. The method of claim 60 wherein (B-3) comprises an alkali or alkaline earth metal salt of an organic acid.

67. The method of claim 66 wherein said organic acid is a sulfonic acid or a carboxylic acid.

68. The method of claim 66 wherein said salt is an alkaline earth metal salt.

69. The method of claim 60 wherein said solid metal-containing particles (B-1) comprise alkaline earth metal salts.

70. The method of claim 60 wherein said solid metal-containing colloidal particles (B-1) comprise calcium carbonate.

71. The method of claim 60 wherein (B-3) is represented by the formula

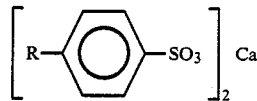

wherein R is a hydrocarbyl group of about 12 to about 30 carbon atoms.

72. The method of claim 60 wherein said disperse system (B) comprises
(B-1) solid calcium carbonate colloidal particles having a unit particle size in the range of about 50 A to about 4000 A,
(B-2) an organic solvent, and
(B-3) a third component represented by the formula

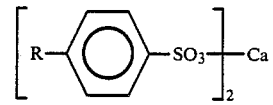

wherein R is a hydrocarbyl group having an average of about 12 to about 30 carbon atoms.

73. The method of claim 60 wherein the molar ratio of (B-1) to (B-3) ranges from about 40:1 to about 2:1.

74. The method of claim 60 wherein said system (B) is characterized by a neutralization base number of about 7 or less.

75. The method of claim 52 wherein (C) comprises from about 2 to about 5 polymer blocks with at least one polymer block of said vinyl aromatic monomer and at least one polymer block of said aliphatic conjugated diene.

76. The method of claim 75 wherein the vinyl aromatic monomer content in said copolymer is in the range of from about 20% to about 70% by weight, and the diene content is in the range of from about 30% to about 80% by weight.

77. The method of claim 75 wherein the number average molecular weight of said copolymer (C) is in the range of from about 10,000 to about 500,000.

78. The method of claim 75 wherein component (C) has 2 or 3 polymer blocks.

79. The method of claim 52 wherein component (C) is a linear block copolymer.

80. The method of claim 52 wherein component (C) is a radial block copolymer.

81. The method of claim 52 wherein said vinyl aromatic compound is a styrene.

82. The method of claim 52 wherein said conjugated diene is isoprene.

83. The method of claim 52 wherein said conjugated diene is 1,3-butadiene.

84. The method of claim 52 wherein the number average molecular weight for said copolymer (C) is in the range of about 30,000 to about 200,000.

85. The method of claim 52 wherein the content of said vinyl aromatic monomer in said copolymer (C) is in the range of about 40% to about 60% by weight, and the content of said diene in said copolymer is in the range of about 40% to about 60% by weight.

86. A method of coating metal surfaces to retard corrosion thereof which comprises applying to the metal surface, a composition comprising a mixture of
(B) a non-Newtonian colloidal disperse system comprising (B-1) solid metal-containing colloidal particles predispersed in (B-2) a liquid dispersing medium, and (B-3) at least one organic compound which is soluble in said dispersing medium, the molecules of said organic compound being characterized by a hydrophobic portion and at least one polar substituent, and (C) at least one hydrogenated block copolymer of a styrene and an aliphatic conjugated diene, said copolymer having from 2 to about 5 polymer blocks with at least one polymer block of said styrene and at least one polymer block of said hydrogenated aliphatic conjugated diene, the content of said styrene in said copolymer being in the range of from about 20% to about 70% by weight and the content of said diene being in the range of from about 30% to about 80% by weight, the number average molecular weight of said copolymer being in the range of about 10,000 to about 500,000.

87. The method of claim 86 also containing (D) a substantially inert, normally liquid organic diluent.

88. The method of claim 86 containing from about 1% to about 20% by weight of (C).

89. The method of claim 86 wherein said solid metal-containing colloidal particles (B-1) comprise solid metal salts.

90. The method of claim 86 wherein the solid metal-containing particles (B-1) are further characterized by having a unit particle size of from about 20 A to about 5000 A.

91. The method of claim 86 wherein the solid metal-containing particles (B-1) are selected from alkali and alkaline earth metal salts.

92. The method of claim 86 wherein said solid metal-containing particles (B-1) comprise alkaline earth metal salts.

93. The method of claim 86 wherein said solid metal-containing colloidal particles (B-1) comprise calcium carbonate.

94. The method of claim 86 wherein (B3) comprises an alkali or alkaline earth metal salt of an organic acid.

95. The method of claim 38 wherein said organic acid is a sulfonic acid or a carboxylic acid.

96. The method of claim 39 wherein said salt is an alkaline earth metal salt.

97. The method of claim 86 wherein (B-3) is represented by the formula

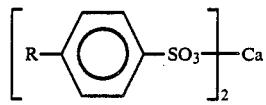

wherein R is a hydrocarbyl group of about 12 to about 30 carbon atoms.

98. The method of claim 86 therein said disperse system (B) comprises (B-1) solid calcium carbonate colloidal particles having a unit particle size in the range of about 50 A to about 4000 A, (B-2) an aromatic solvent; and (B-3) a third component represented by the formula

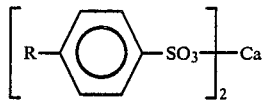

wherein R is a hydrocarbyl group having an average of about 12 to about 30 carbon atoms.

99. The method of claim 86 wherein the molar ratio of (B-1) to (B-3) ranges from about 40:1 to about 2:1.

100. The method of claim 86 wherein component (C) has 2 or 3 polymer blocks.

101. The method of claim 86 wherein component (C) is a linear block copolymer.

102. The method of claim 86 wherein component (C) is a radial block copolymer.

103. The method of claim 86 wherein said styrene is styrene.

104. The method of claim 86 wherein said conjugated diene is isoprene.

105. The method of claim 86 wherein said conjugated diene is 1,3-butadiene.

106. The method of claim 86 wherein the styrene content in said copolymer is in the range of about 40% to about 60% by weight, and the diene content in said copolymer is in the range of from about 40% to about 60% by weight.

107. The metal surface treated in accordance with the method of claim 52.

108. The metal surface treated in accordance with the method of claim 86.

* * * * *